(12) United States Patent
Takagi

(10) Patent No.: US 10,505,200 B2
(45) Date of Patent: Dec. 10, 2019

(54) APPARATUS AND METHOD MANUFACTURING COMPOSITE MEMBRANE

(71) Applicant: SCREEN Holdings Co., Ltd., Kyoto (JP)

(72) Inventor: Yoshinori Takagi, Kyoto (JP)

(73) Assignee: SCREEN Holdings Co., Ltd., Kyoto (JP)

( * ) Notice: Subject to any disclaimer, the term of this patent is extended or adjusted under 35 U.S.C. 154(b) by 0 days.

(21) Appl. No.: 16/049,276

(22) Filed: Jul. 30, 2018

(65) Prior Publication Data

US 2018/0342738 A1 Nov. 29, 2018

Related U.S. Application Data

(63) Continuation of application No. 14/280,763, filed on May 19, 2014, now abandoned.

(30) Foreign Application Priority Data

May 20, 2013 (JP) ................................. 2013-105838

(51) Int. Cl.
*H01M 4/88* (2006.01)
*B32B 38/00* (2006.01)
(Continued)

(52) U.S. Cl.
CPC ........ *H01M 4/8882* (2013.01); *B29D 99/005* (2013.01); *B32B 38/164* (2013.01);
(Continued)

(58) Field of Classification Search
CPC ........................... H01M 4/8882; B32B 38/164
See application file for complete search history.

(56) References Cited

U.S. PATENT DOCUMENTS 4,520,048 A 5/1985 Ranger
5,211,984 A 5/1993 Wilson
(Continued)

FOREIGN PATENT DOCUMENTS

CN 1795575 6/2006
DE 20 2005 012 635 2/2006
(Continued)

OTHER PUBLICATIONS

Office Action issued by Canadian Patent Office dated Jul. 13, 2015 in connection with corresponding Canadian Patent Application No. 2,852,565.
(Continued)

*Primary Examiner* — Philip C Tucker
*Assistant Examiner* — John Blades
(74) *Attorney, Agent, or Firm* — Ostrolenk Faber LLP

(57) ABSTRACT

An electrolyte membrane with a backsheet is sent out from an electrolyte membrane unwinding roller, and is separated with its second side sucked on a suction roller by a first press roller. While the electrolyte membrane from which the backsheet has been separated is transported with the electrolyte membrane sucked and supported on the suction roller, an electrode ink is applied to a first side of the electrolyte membrane to form an electrode ink layer, which is dried by blowing hot air thereto to form a catalyst layer. Thereafter, in a state in which the outer surface of a second press roller disposed close to the suction roller is in contact with and supported on the first side of the electrolyte membrane, a support film is pressed against the second side of the electrolyte membrane by a third press roller and attached thereto to manufacture a catalyst-coated membrane.

4 Claims, 14 Drawing Sheets

(51) Int. Cl.
  *B29D 99/00* (2010.01)
  *B01D 69/12* (2006.01)
  *B32B 37/00* (2006.01)
  *H01M 8/1018* (2016.01)
  *B32B 37/20* (2006.01)
  *B32B 38/10* (2006.01)

(52) U.S. Cl.
  CPC ......... *H01M 4/881* (2013.01); *H01M 4/8828* (2013.01); *H01M 4/8896* (2013.01); *B01D 69/12* (2013.01); *B01D 2323/42* (2013.01); *B32B 37/0053* (2013.01); *B32B 37/203* (2013.01); *B32B 38/004* (2013.01); *B32B 38/10* (2013.01); *B32B 2309/105* (2013.01); *B32B 2457/18* (2013.01); *H01M 2008/1095* (2013.01)

(56) References Cited

U.S. PATENT DOCUMENTS

| | | | |
|---|---|---|---|
| 5,234,777 | A | 8/1993 | Wilson |
| 6,093,256 | A | 7/2000 | Dwiggins |
| 7,195,690 | B2 | 3/2007 | Mekala et al. |
| 8,828,620 | B2 | 9/2014 | Mekala et al. |
| 2004/0071881 | A1 | 4/2004 | Wang et al. ............... 427/372.2 |
| 2004/0241525 | A1 | 12/2004 | Mekala et al. |
| 2006/0216563 | A1 | 9/2006 | Matsunaga |
| 2007/0190253 | A1 | 8/2007 | Matsunaga |
| 2009/0169950 | A1 | 7/2009 | Prugh et al. .................... 429/30 |
| 2009/0255621 | A1 | 10/2009 | Edvardsson |
| 2010/0051181 | A1 | 3/2010 | Mori |
| 2012/0003572 | A1 | 1/2012 | Matsumura et al. ......... 429/535 |
| 2012/0315571 | A1* | 12/2012 | Matsumura ......... H01M 8/1004 429/535 |
| 2012/0321986 | A1 | 12/2012 | Mekala et al. |

FOREIGN PATENT DOCUMENTS

| | | |
|---|---|---|
| JP | 2001-070863 | 3/2001 |
| JP | 2003-100314 | 4/2003 |
| JP | 2004-351413 | 12/2004 |
| JP | 2006-012525 A | 1/2006 |
| JP | 2006-339062 | 12/2006 |
| JP | 2007-196092 A | 8/2007 |
| JP | 2007-250539 A | 9/2007 |
| JP | 2008-027738 | 2/2008 |
| JP | 2009-57211 A | 3/2009 |
| JP | 2010-089847 A | 4/2010 |
| JP | 2010-189077 A | 9/2010 |
| JP | 2011-508952 A | 3/2011 |
| JP | 2011-165460 | 8/2011 |
| JP | 2011-196535 A | 10/2011 |
| JP | 2011-249318 A | 12/2011 |
| JP | 2012-104405 A | 5/2012 |
| JP | 2012-164422 | 8/2012 |
| JP | 2013-004393 | 1/2013 |
| WO | WO 92/15121 | 9/1992 |
| WO | WO 2004/096450 | 11/2004 |
| WO | WO 2011/099285 A1 | 8/2011 |

OTHER PUBLICATIONS

Korean Office Action dated Jun. 24, 2015 in connection with corresponding Korean Application No. 10-2014-0059770.
Office Action issued by the Korean Patent Office dated Dec. 30, 2016 in connection with counterpart Korean Patent Application No. 10-216-0026599 with English translation of the Korean Office Action based on the Japanese translation.
Japanese Office Action dated Jan. 16, 2018. English translation is not prepared because no ground of rejection is raised based on the prior-art documents.
Aug. 29, 2016 Chinese Office Action with Japanese translation of same and English translation of Japanese portions relevant to prior-art based rejections.
Korean Office Action dated Dec. 31, 2015 with English translation based on the Japanese translation.
Chinese Office Action dated Dec. 29, 2015 with English translation based on Japanese translation.
Jun. 7, 2016 Korean Office Action with English translation of portions relevant to prior-art based rejections translated from a Japanese translation of same.
Search Report Issued by European Patent Office dated Nov. 13, 2014 in connection with corresponding European application No. EP 14 168 811.9.
Japanese Office Action dated Dec. 13, 2016 in connection with corresponding Japanese Patent Application No. 2014-189802 with partial English translation of the portions relevant to prior-art based rejections.
Office Action issued by the Canadian Patent Office dated Jul. 12, 2017 in connection with corresponding Canadian Patent Application No. 2,935,992.
Office Action issued by the European Patent Office dated Jul. 31, 2017 in connection with corresponding European Patent Application No. 14168811.9-1370.
Office Action dated Oct. 31, 2018 in counterpart Korean Patent Application No. 10-2016-0026599 with Japanese translation and English translation based on the Japanese translation.
Office Action dated Mar. 13, 2019 in corresponding European Patent Application No. 14 168 811.9.

\* cited by examiner

F I G. 3
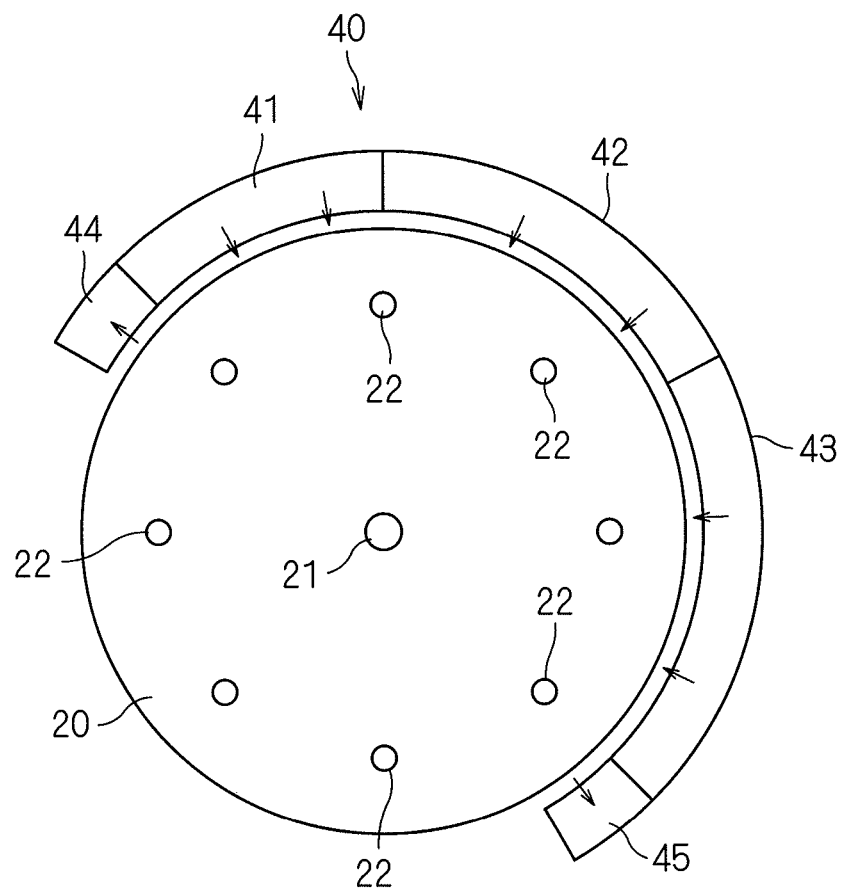

F I G . 4
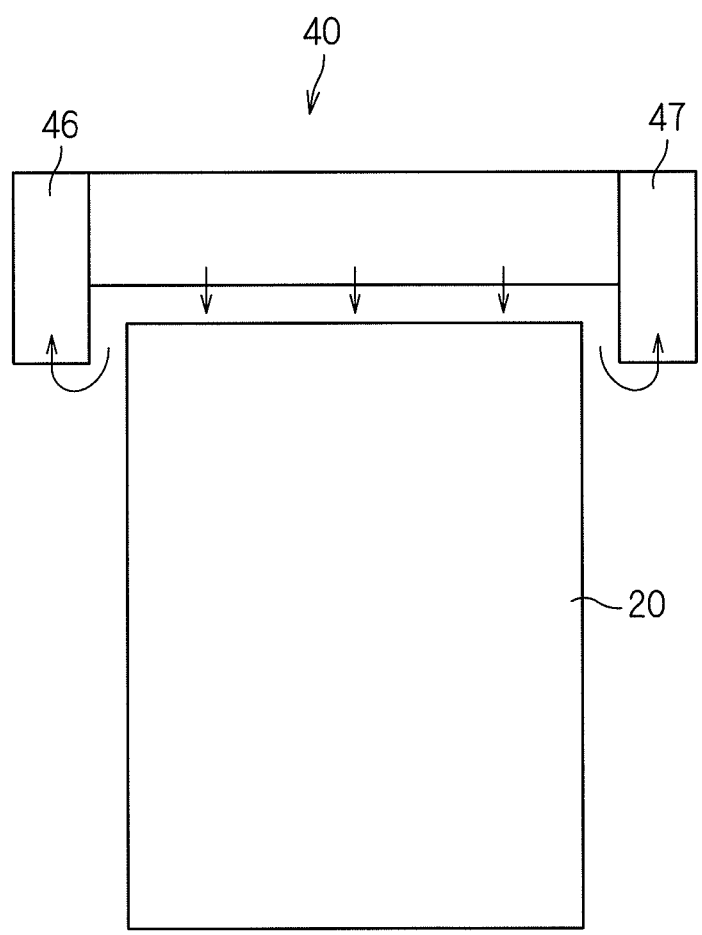
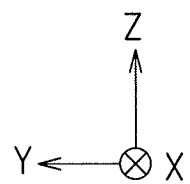

F I G. 6
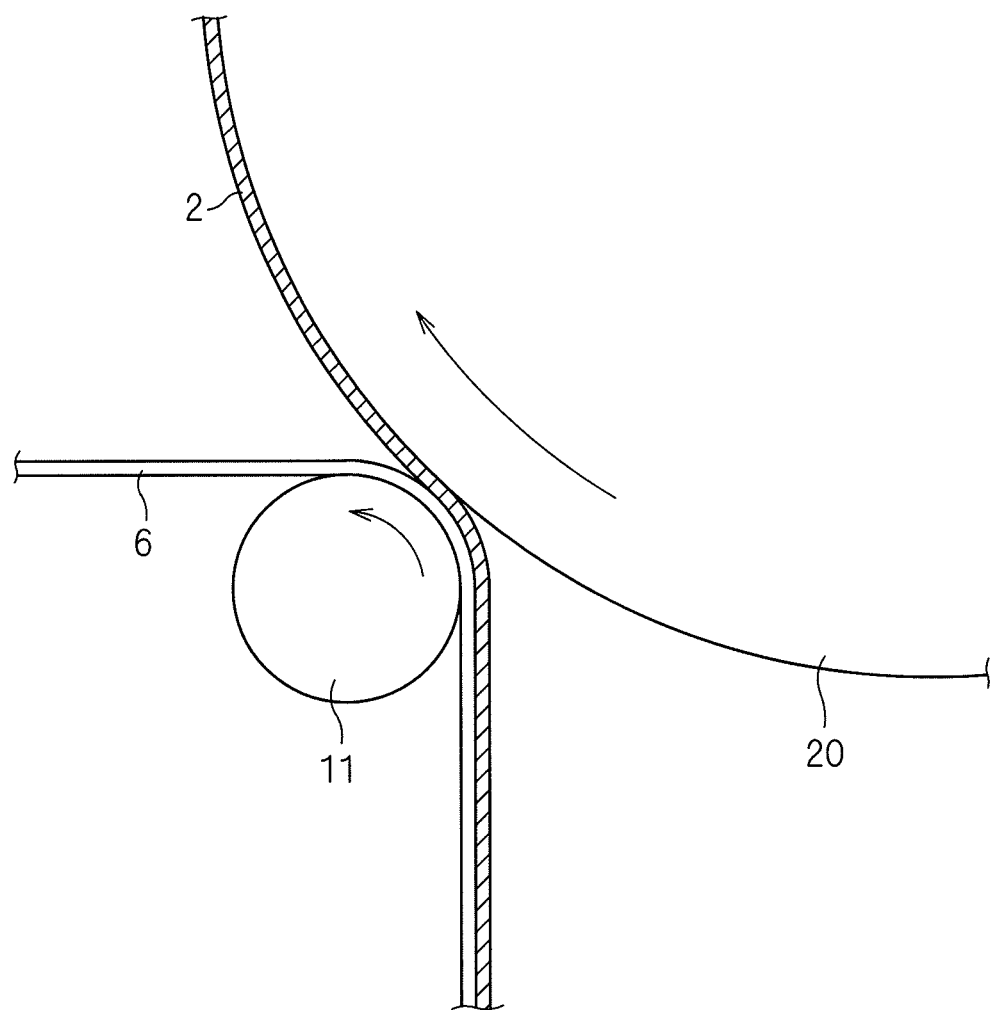

F I G . 8
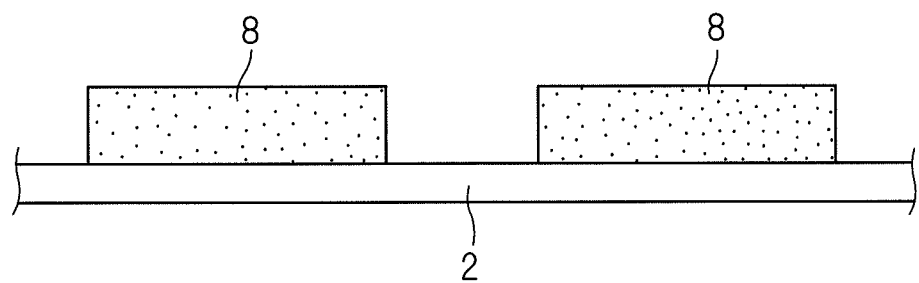
F I G . 9
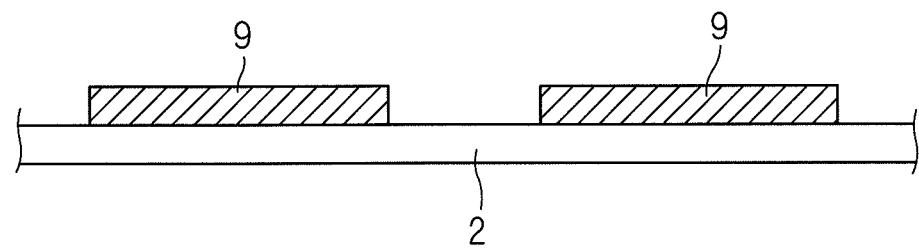

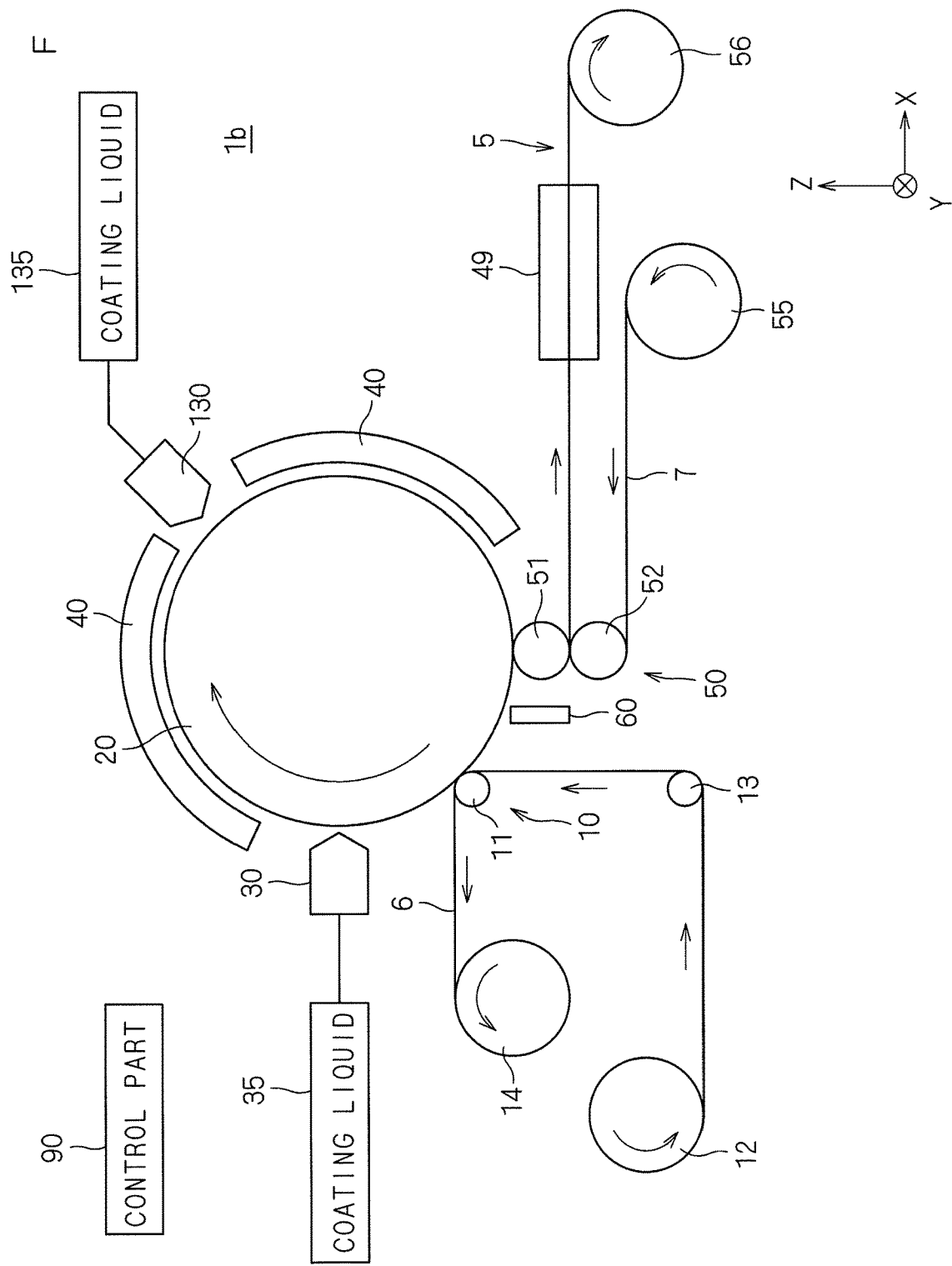

F I G. 1 7
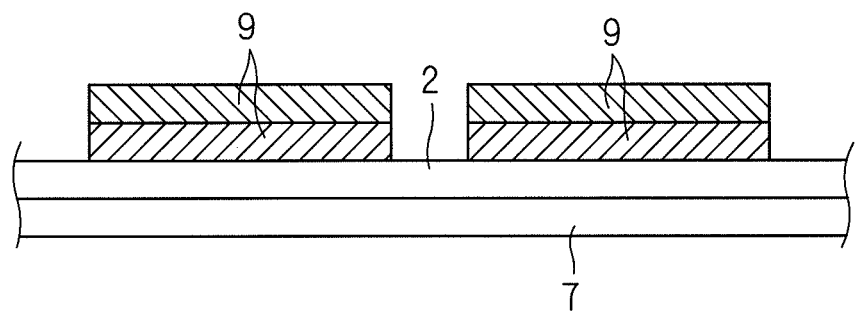

APPARATUS AND METHOD MANUFACTURING COMPOSITE MEMBRANE

CROSS-REFERENCE TO RELATED APPLICATIONS

The present patent application is a continuation of prior U.S. patent application Ser. No. 14/280,763, filed May 19, 2014, by Yoshinori TAKAGI and entitled "Apparatus and Method for Manufacturing Composite Membrane," which claims priority to Japanese Patent Application No. JP2013-105838, filed May 20, 2013. The contents of each of the patent applications listed above are incorporated in full herein by reference.

BACKGROUND OF THE INVENTION

Field of the invention

The present invention relates to an apparatus and a method for manufacturing a composite membrane, such as a catalyst-coated membrane for a fuel cell, having a functional layer formed on a band-like thin film.

Description of the Background Art

In recent years, fuel cells have been garnering attention as drive power sources for automobiles, household uses, mobile phones and the like. A fuel cell is a power generation system that generates electric power through electrochemical reaction between hydrogen ($H_2$) contained in the fuel and oxygen ($O_2$) in the air, and is characterized by high power generation efficiency and low environmental load.

There are several types of fuel cells that vary according to the electrolytes used. One of them is a polymer electrolyte fuel cell (PEFC) that uses an ion-exchange membrane (electrolyte membrane) as the electrolyte. PEFCs are capable of operating at room temperature and can be reduced in size and weight, and therefore, they are expected to be applied to automobiles and portable devices.

A catalyst-coated membrane (CCM) used for a polymer electrolyte fuel cell is a composite membrane having catalyst layers formed on both sides of a thin film of an electrolyte as functional layers. A gas diffusion layer and a separator are disposed on the opposite sides of the catalyst-coated membrane, and thereby, a unit cell is formed. Such a catalyst-coated membrane is made by applying, to the surface of the electrolyte membrane, an electrode ink (electrode paste) obtained by dispersing a catalyst containing platinum (Pt) in a solvent such as alcohol. However, the electrolyte membrane has the tendency of undergoing swelling and shrinkage by easily absorbing the solvent contained in the electrode ink and moisture in the atmosphere. This has posed a problem in that creases and pinholes are generated in the electrolyte membrane at the time of applying and drying the electrode ink. Generation of creases and pinholes in the electrolyte membrane leads to a reduction in the power generation performance of the fuel cell.

To solve such a problem, Japanese Patent Application Laid-Open - No. 2001-70863 discloses a technique for transporting an electrolyte membrane while sucking the electrolyte membrane using a suction heating roller, and immediately heating and drying the electrode ink applied to the electrolyte membrane, thereby inhibiting deformation of the electrolyte membrane. Additionally, US2007/0190253 discloses a technique for spray applying an electrode ink to an electrolyte membrane that is sucked on a roller, and drying the electrode ink by heating with a roller. Furthermore, Japanese Patent Application Laid-Open No. 2011-165460 discloses suspending an electrolyte membrane having a shape-retaining film attached to its one side on a backup roller, applying a catalyst ink onto the other side of the electrolyte membrane, and also attaching a shape-retaining film to the other side of the electrolyte membrane on which a catalyst layer has been formed after the catalyst ink was dried, thereby preventing creases from being generated in the electrolyte membrane.

However, with the techniques disclosed in Japanese Patent Application Laid-Open No. 2001-70863 and US2007/0190253, the electrode ink is applied, with the electrolyte membrane being sucked by the roller. Accordingly, although it is possible to prevent deformation due to swelling of the electrolyte membrane during coating, there is the possibility that the electrolyte membrane may undergo swelling and shrinkage caused by the absorption of the solvent of the electrode ink and the drying of the ink when the electrolyte membrane is separated from the roller after coating. Moreover, with the technique disclosed in Japanese Patent Application Laid-Open No. 2011-165460, the electrolyte membrane is simply suspended on the backup roller, and therefore, there is the possibility that the electrolyte membrane may be displaced from the shape-retaining film during coating in the case of applying an electrode ink using a solvent that undergoes a significant degree of swelling. That is, in any case, there is the possibility that the electrolyte membrane may undergo deformation during manufacture of the catalyst-coated membrane.

SUMMARY OF THE INVENTION

The present invention is directed to an apparatus for manufacturing a composite membrane having a functional layer formed on a band-like thin film.

According to one aspect of the present invention, the manufacturing apparatus includes a suction roller that sucks and supports the thin film on an outer surface thereof, a coating part that applies a coating liquid to one side of the thin film that is transported while being sucked and supported on the suction roller, a drying part that is provided to cover a portion of the outer surface of the suction roller and dries the coating liquid applied to the one side of the thin film to form the functional layer, and an attachment part that attaches a band-shaped first supporting member to another side of the thin film on which the functional layer is formed, the attachment part including a first roller that comes into contact with the one side of the thin film and supports the thin film while being in contact with or close to the suction roller, and being configured to attach the first supporting member to the other side of the thin film with the one side of the thin film being in contact with and supported on an outer surface of the first roller.

During and after the application of the coating liquid, the thin film is continuously supported by the suction roller, the first roller, and the first supporting member, and it is thus possible to inhibit deformation of the thin film throughout transport during and after coating.

Preferably, the manufacturing apparatus further includes a separation part that separates a band-shaped second supporting member from the thin film having the second supporting member attached to the one side thereof, the separation part including a third roller that separates the second supporting member with the other side of the thin film being sucked on the suction roller.

This makes possible to inhibit deformation of the thin film throughout a series of steps of manufacturing a composite membrane.

Preferably, the drying part is divided into a plurality of drying zones, and drying temperatures of the plurality of drying zones sequentially increase in order from an upstream side toward a downstream side in a transport direction in which the thin film is transported.

The applied coating liquid is gradually dried, making it possible to prevent the occurrence of cracking in the functional layer due to rapid drying.

Preferably, the drying part includes a heat-shielding zone on at least the most upstream side in the transport direction.

This makes it possible to prevent coating failure due to leakage of heated atmosphere.

Preferably, the manufacturing apparatus further includes an auxiliary drying part that heats the thin film to which the first supporting member is attached by the attachment part.

This makes it possible to sufficiently dry the coating liquid.

Preferably, the manufacturing apparatus further includes a cooling part that cools the suction roller.

This makes it possible to prevent the suction roller from storing heat, thus preventing the coating liquid from being rapidly dried during coating.

The present invention is also directed to a method for manufacturing a composite membrane having a functional layer formed on a band-like thin film.

According to one aspect of the present invention, the manufacturing method includes the steps of (a) sucking and supporting the thin film on an outer surface of a suction roller, (b) applying a coating liquid to one side of the thin film that is transported while being sucked and supported on the suction roller, (c) drying the coating liquid applied to the one side of the thin film to form the functional layer, and (d) attaching a band-shaped first supporting member to another side of said thin film in a state in which the one side of said thin film on which said functional layer is formed is in contact with and supported on an outer surface of a first roller that comes into contact with the one side of said thin film and supports said thin film while being in contact with or close to said suction roller.

During and after the application of the coating liquid, the thin film is continuously supported by the suction roller, the first roller, and the first supporting member, and it is thus possible to inhibit deformation of the thin film throughout transport during and after coating.

Preferably, the manufacturing method further includes the step of (e) separating a band-shaped second supporting member from the thin film having the second supporting member attached to the one side thereof.

This makes it possible to inhibit deformation of the thin film throughout a series of the steps of manufacturing a composite membrane.

Therefore, it is an object of the present invention to inhibit deformation of a thin film throughout transport during and after coating.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a diagram showing a configuration of a suction roller and a drying furnace;

FIG. 4 is a front view of the suction roller and the drying furnace;

FIG. 6 is a diagram showing how a backsheet is separated and an electrolyte membrane is sucked on a suction roller by a first press roller;

FIG. 8 is a cross-sectional view of the electrolyte membrane having an electrode ink intermittently applied thereto;

FIG. 9 is a cross-sectional view of the electrolyte membrane having a catalyst layer formed thereon;

FIG. 16 is a side view of a manufacturing apparatus for a composite membrane according to a third preferred embodiment; and FIG. 17 is a cross-sectional view of an electrolyte membrane having a support film attached to a second side of an electrolyte membrane having catalyst layers laminated on a first side thereof.

DESCRIPTION OF THE PREFERRED EMBODIMENTS

Hereinafter, preferred embodiments of the present invention will be described in detail with reference to the drawings.

1. First Preferred Embodiment

Figure 1:
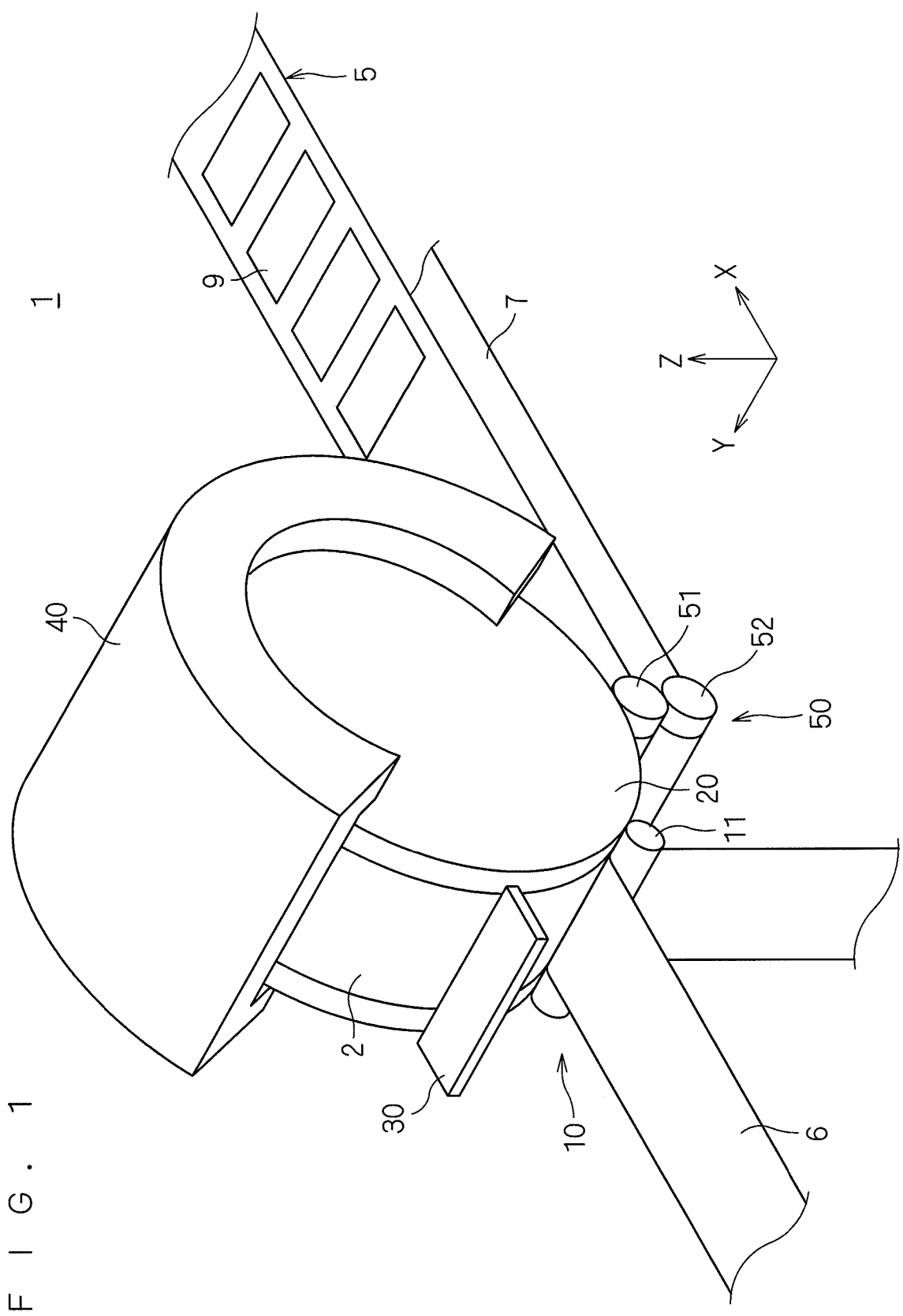
FIG. 1 is a perspective view showing a schematic overall configuration of a manufacturing apparatus for a composite membrane according to the present invention.
Figure 2:
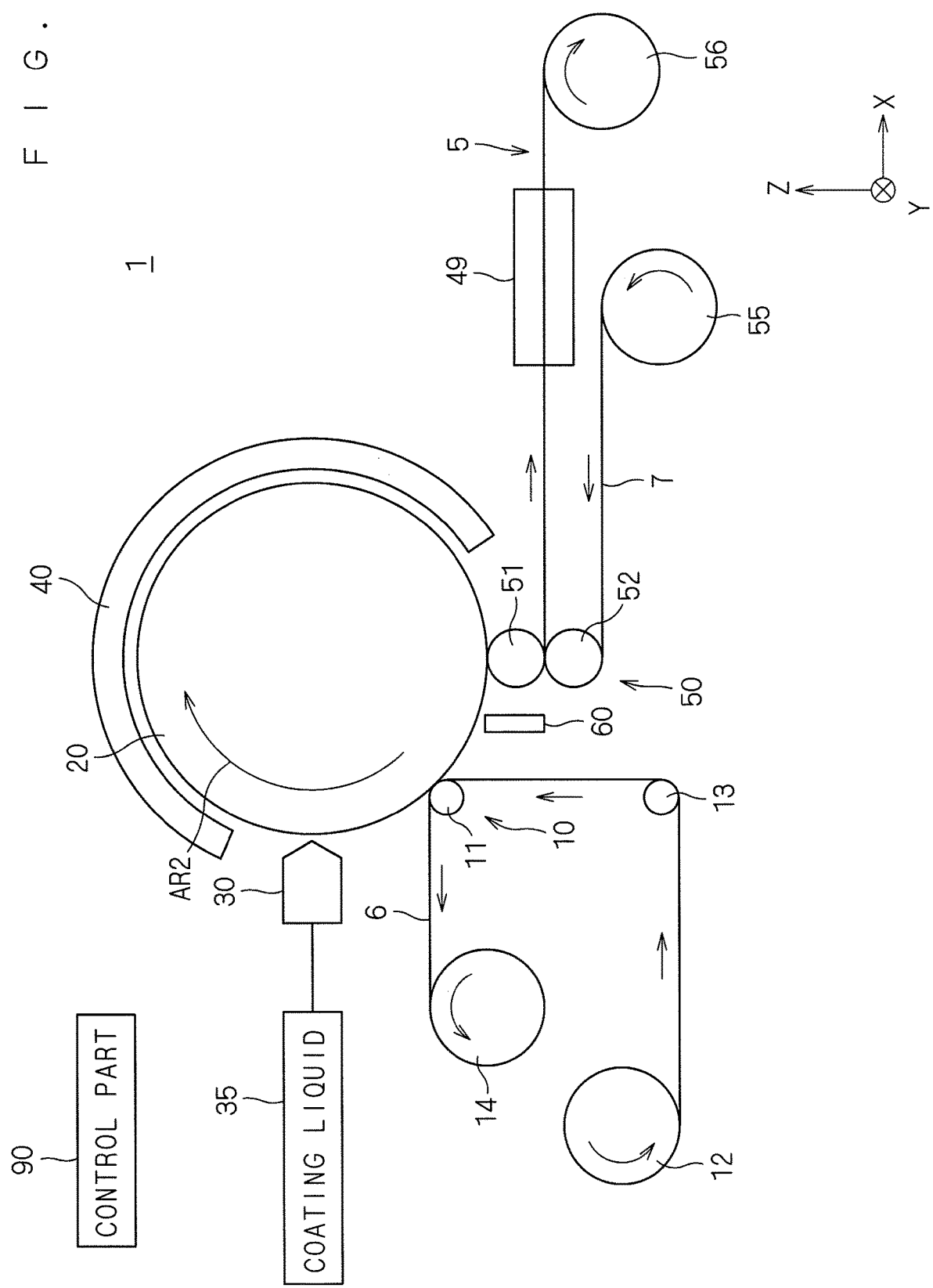
FIG. 2 is a side view of the manufacturing apparatus of FIG. 1.

FIG. 1 is a perspective view showing a schematic overall configuration of a manufacturing apparatus 1 for a composite membrane according to the present invention. FIG. 2 is a side view of the manufacturing apparatus 1 of FIG. 1. The manufacturing apparatus 1 for a composite membrane is an apparatus for manufacturing a catalyst-coated membrane 5 for a polymer electrolyte fuel cell by applying an electrode ink (electrode paste) to the surface of an electrolyte membrane 2, which is a band-like thin film, and drying the electrode ink to form a catalyst layer (electrode) as a functional layer on the electrolyte membrane 2. To clarify the directional relationship, FIG. 1 and the subsequent drawings each show an XYZ Cartesian coordinate system in which the Z-axis direction is the vertical direction and the XY plane is the horizontal plane. For facilitating the understanding, the dimensions and the numbers of various components are exaggerated or simplified in FIG. 1 and the subsequent drawings.

The manufacturing apparatus 1 includes, as its main constituent elements, a separation part 10 that separates a backsheet 6 from the electrolyte membrane 2, a suction roller 20 that transports the electrolyte membrane 2 while sucking and supporting the electrolyte membrane 2, a coating nozzle 30 that applies an electrode ink to a surface of the electrolyte membrane 2, a drying furnace 40 that heats and dries the applied electrode ink, and an attachment part 50 that attaches a support film to the electrolyte membrane 2 that has undergone the drying step.

The separation part 10 includes a first press roller 11 (third roller). The manufacturing apparatus 1 also includes an electrolyte membrane unwinding roller 12, an auxiliary roller 13, and a backsheet winding roller 14. The electrolyte membrane unwinding roller 12, around which the electrolyte membrane 2 with the backsheet 6 is wound, continuously sends out the electrolyte membrane 2 with the backsheet 6.

As the electrolyte membrane 2, it is possible to use fluorine-based or hydrocarbon-based polymer electrolyte membranes that have been used thus far in an application to catalyst-coated membranes of polymer electrolyte fuel cells. For example, the electrolyte membrane 2 may be a polymer electrolyte membrane containing perfluorocarbon sulfonic acid (e.g., Nafion (registered trademark) manufactured by USA DuPont, Flemion (registered trademark) manufactured by Asahi Glass Co. Ltd, Aciplex (registered trademark) manufactured by Asahi Kasei Corporation, and Goreselect (registered trademark) manufactured by Gore).

The electrolyte membrane 2 described above is very thin and low in mechanical strength. Thus, the electrolyte membrane 2 has the characteristics of easily swelling even with a small amount of moisture in the air, and also shrinking with decreasing humidity, so that it is highly likely to undergo deformation. For this reason, in the initial state, the electrolyte membrane 2 with the backsheet 6 is wound around the electrolyte membrane unwinding roller 12 in order to prevent deformation of the electrolyte membrane 2. As the backsheet 6, it is possible to use a film of a resin material having high mechanical strength and an excellent shape-retaining function, such as PEN (polyethylene naphthalate) and PET (polyethylene terephthalate).

The initial-state electrolyte membrane 2 with the backsheet 6, which is wound around the electrolyte membrane unwinding roller 12, has a film thickness of 5 to 30 μm and a width of approximately 300 mm at maximum. The film thickness of the backsheet 6 is 25 to 100 μm, and the width is equal to or slightly greater than the width of the electrolyte membrane 2. In the first preferred embodiment, the backsheet 6 is attached to a first side of the electrolyte membrane 2.

The electrolyte membrane 2 with the backsheet 6 that has been sent out from the electrolyte membrane unwinding roller 12 is suspended on the auxiliary roller 13 and is pressed against the suction roller 20 by the first press roller 11. The first press roller 11 is supported by a cylinder (not shown) at a position close to and spaced a predetermined interval from the outer surface of the suction roller 20. The interval between the first press roller 11 and the outer surface of the suction roller 20 is smaller than the thickness of the electrolyte membrane 2 with the backsheet 6. Accordingly, a second side of the electrolyte membrane 2 is pressed against the suction roller 20 when the electrolyte membrane 2 with the backsheet 6 passes between the first press roller 11 and the suction roller 20. The force with which the first press roller 11 presses the electrolyte membrane 2 with the backsheet 6 against the suction roller 20 is controlled by adjusting the interval between the first press roller 11 and the suction roller 20 by the above-described cylinder.

By the first press roller 11 pressing the second side of the electrolyte membrane 2 against the suction roller 20, the electrolyte membrane 2 is sucked onto the outer surface of the suction roller 20. At this time, the backsheet 6 is separated from the first side of the electrolyte membrane 2 and is wound by the backsheet winding roller 14. That is, the first press roller 11 of the separation part 10 serves to separate the backsheet 6 from the electrolyte membrane 2 with the backsheet 6 and to cause the electrolyte membrane 2 to be sucked on the suction roller 20 by pressing the electrolyte membrane 2 against the suction roller 20. The backsheet winding roller 14 continuously winds the backsheet 6 by being continuously rotated by a motor (not shown), and provides a constant tension to the electrolyte membrane 2 with the backsheet 6 that is transported from the electrolyte membrane unwinding roller 12 via the auxiliary roller 13 to the first press roller 11.

The suction roller 20 is a columnar member installed such that its central axis extends along the Y-axis direction. The dimensions of the suction roller 20 are, for example, a height (a length in the Y-axis direction) of 400 mm and a diameter of 400 to 1600 mm. The suction roller 20 is rotated in the direction indicated by the arrow AR2 shown in FIG. 2 by a motor (not shown) about the central axis along the Y-axis direction as the center of rotation.

The suction roller 20 is a porous roller formed of porous carbon or porous ceramics. For example, a sintered body of alumina ($Al_2O_3$) or silicon carbide (SiC) can be used as the porous ceramics. The pore diameter of the porous suction roller 20 is 5 μm or less, and the porosity thereof is in the range of 15 to 50%. The surface roughness of the outer surface (column circumferential surface) of the suction roller 20 is 5 μm or less in terms of Rz (maximum height), and this value is preferably as small as possible. Additionally, the total runout (fluctuations in the distance from the rotational shaft to the outer surface) of the suction roller 20 during rotation is set to 10 μm or less.

FIG. 3 is a diagram showing a configuration of the suction roller 20 and the drying furnace 40. The top surface and/or bottom surface of the suction roller 20 is provided with a suction port 21. The suction port 21 is sucked by a suction mechanism (e.g., an exhaust pump), which is not shown, and thereby, a negative pressure is applied thereto. The suction roller 20 is porous with a porosity of 15 to 50%. Thus, when a negative pressure is applied to the suction port 21, a negative pressure of a predetermined value (the pressure for suction from the surrounding atmosphere to the outer surface) uniformly acts on the outer surface of the suction roller 20 through the internal pores. For example, in the present embodiment, a negative pressure of 90 kPa or more is applied to the suction port 21, causing a negative pressure of 10 kPa or more to uniformly act on the outer surface of the suction roller 20. This enables the suction roller 20 to uniformly suck the electrolyte membrane 2 along the entire width (in the Y-axis direction).

The suction roller 20 is also provided with a plurality of water-cooled tubes 22. The water-cooled tubes 22 are provided in a uniform arrangement density so as to circulate inside the suction roller 20. The water-cooled tubes 22 are supplied with constant-temperature water adjusted to a predetermined temperature from a water supply mechanism (not shown). The constant-temperature water that has flowed through the inside of the water-cooled tubes 22 is discharged to a drainage mechanism (not shown). By passing the constant-temperature water through the water-cooled tubes 22, the suction roller 20 is cooled.

Referring back to FIGS. 1 and 2, a coating nozzle 30 is provided so as to oppose the outer surface of the suction roller 20. The coating nozzle 30 is provided on the downstream side of the first press roller 11 in the transport direction of the electrolyte membrane 2 by the suction roller 20. The coating nozzle 30 is a slit nozzle that includes a slit-shaped discharge port at its end (the end on the +X side). The longitudinal direction of the slit-shaped discharge port is the Y-axis direction. The coating nozzle 30 is provided at a position where the slit-shaped discharge port is at a predetermined interval from the outer surface of the suction roller 20. Additionally, the coating nozzle 30 is provided such that its position and orientation relative to the suction roller 20 can be adjusted by a drive mechanism (not shown).

An electrode ink is supplied as a coating liquid from a coating liquid supply mechanism 35 to the coating nozzle 30. The electrode ink used in the present embodiment contains, for example, catalyst particles, an ion-conducting electrolyte, and a dispersion medium. The catalyst particles may be any known or commercially available catalyst particles without any particular limitations, as long as they can cause a fuel cell reaction in the anode or cathode of a polymer electrolyte fuel cell. For example, it is possible to use platinum (Pt), a platinum alloy, a platinum compound, and the like. Among them, examples of the platinum alloy include alloys of platinum with at least one selected from the group consisting of ruthenium (Ru), palladium (Pd), nickel (Ni), molybdenum (Mo), iridium (Ir), and iron (Fe), for example. In general, platinum is used as the catalyst particles for the cathode electrode ink, and any of the above-described platinum alloys is used as the catalyst particles for the anode electrode ink.

Alternatively, the catalyst particles may be so-called catalyst-supporting carbon powder in which catalyst fine particles are supported on carbon powder. The average particle diameter of the catalyst-supporting carbon is usually about 10 to 100 nm, preferably about 20 to 80 nm, most preferably about 40 to 50 nm. There is no particular limitation on the carbon powder that supports the catalyst fine particles, and examples thereof include carbon blacks such as channel black, furnace black, ketjen black, acetylene black, and lamp black, graphite, activated carbon, carbon fiber, and carbon nanotube. They may be used alone or in combination of two or more.

A solvent is added to the above-described catalyst particles to form a paste that can be applied from the slit nozzle. As the solvent, it is possible to use water or organic solvents including, for example, alcohol-based solvents such as ethanol, n-propanol and n-butanol, ether-based solvents, ester-based solvents, and fluorine-based solvents.

A polyelectrolyte solution having an ion-exchange group is further added to a solution obtained by dispersing the catalyst particles in the solvent. As an example, an electrode ink can be obtained by dispersing carbon black that supports 50 wt % of platinum ("TEC10E50E" manufactured by TANAKA KIKINZOKU KOGYO K.K.) in a solution of water, ethanol, propylene glycol, and polyelectrolyte (a Nafion liquid "D2020" manufactured by USA DuPont). The resultant paste mixture is supplied as an electrode ink from the coating liquid supply mechanism 35 to the coating nozzle 30.

The coating liquid supply mechanism 35 includes a tank for storing the above-described electrode ink, a supply tube that openly connects the tank with the coating nozzle 30, and an open/close valve provided to the supply tube. The coating liquid supply mechanism 35 can continuously supply the electrode ink to the coating nozzle 30 by keeping the open/close valve open, or can intermittently supply the electrode ink to the coating nozzle 30 by repeatedly opening and closing the open/close valve.

The electrode ink supplied from the coating liquid supply mechanism 35 is applied from the coating nozzle 30 to the first side of the electrolyte membrane 2 that is transported while being sucked and supported on the suction roller 20. The electrode ink is continuously applied to the electrolyte membrane 2 when the coating liquid supply mechanism 35 continuously supplies the electrode ink, and the electrode ink is intermittently applied to the electrolyte membrane 2 when the electrode ink is intermittently supplied.

The drying furnace 40 is provided so as to cover a portion of the outer surface of the suction roller 20. As shown in FIG. 3, the drying furnace 40 is divided into a total of five zones, including three drying zones 41, 42, and 43 and two heat-shielding zones 44 and 45. Each of the three drying zones 41, 42, and 43 blows hot air towards the outer surface of the suction roller 20 by using a hot air blast from a hot-air blowing part (not shown). The blast of hot air from the drying furnace 40 dries the electrode ink applied to the first side of the electrolyte membrane 2.

The three drying zones 41, 42, and 43 are different in the temperature of the blowing hot air. The temperatures of the hot air blown by the three drying zones 41, 42, and 43 sequentially increase in order from the upstream side toward the downstream in the transport direction of the electrolyte membrane 2 by the suction roller 20 (clockwise on the plane of FIG. 3). For example, the hot air temperature of the drying zone 41 on the most upstream side is in the range of room temperature to 40° C., the hot air temperature of the intermediate drying zone 42 is in the range of 40 to 80° C., and the hot air temperature of the drying zone 43 on the most downstream is in the range of 50 to 100° C.

The two heat-shielding zones 44 and 45 are provided at the opposite ends of the drying zone 41, 42, and 43 in the transport direction of the electrolyte membrane 2. The heat-shielding zone 44 is provided on the upstream side of the drying zone 41, and the heat-shielding zone 45 is provided on the downstream side of the drying zone 43. The two heat-shielding zones 44 and 45 suck the atmosphere in the vicinity of the outer surface of the suction roller 20 by using the exhaust gas from an air exhaust part (not shown). This can prevent the hot air blown out from the drying zones 41, 42, and 43 from flowing beyond the drying furnace 40 to the upstream and downstream sides of the suction roller 20 and can also prevent the solvent vapor or the like generated from the electrode ink during drying from leaking out of the drying furnace 40. Note that if there is at least the heat-shielding zone 44 on the upstream side, it is possible to prevent the occurrence of coating failure caused by a hot air blast from the drying zones 41, 42, and 43 flowing into the coating nozzle 30 and drying the area in the vicinity of the discharge port.

FIG. 4 is a front view of the suction roller 20 and the drying furnace 40. The drying furnace 40 is also provided with suction parts 46 and 47 at the opposite ends in the width direction (Y-axis direction) of the suction roller 20. As with the heat-shielding zones 44 and 45, the suction parts 46 and 47 suck the surrounding atmosphere. This makes it also possible to suck and recover, for example, the hot air and the solvent vapor that are about to leak from the opposite ends of the drying furnace 40 in the width direction.

Referring back to FIGS. 1 and 2, an attachment part 50 is provided on the downstream side of the drying furnace 40 in the transport direction of the electrolyte membrane 2 by the suction roller 20. The attachment part 50 includes a second press roller 51 (first roller) and a third press roller 52 (second roller). The second press roller 51 is supported by a cylinder (not shown) at a position that is close to and spaced a predetermined interval from the outer surface of the suction roller 20. The interval between the second press roller 51 and the outer surface of the suction roller 20 is smaller than the thickness of the electrolyte membrane 2 that has undergone the dry process (the total thickness of the electrolyte membrane 2 and the catalyst layer). Accordingly, the first side of the electrolyte membrane 2 that includes the catalyst layer is pressed against the second press roller 51 when the electrolyte membrane 2 that has undergone the dry process passes between the second press roller 51 and the suction roller 20.

The third press roller 52 is supported by a cylinder (not shown) at a position that is close to and spaced a predetermined interval from the second press roller 51. The interval between the third press roller 52 and the second press roller 51 is smaller than a value obtained by adding the thickness of the support film 7, which will be described later, to the total thickness of the electrolyte membrane 2 and the catalyst layer. Note that the first press roller 11, the second press roller 51, and the third press roller 52 each may be a metal roller or a resin roller having about the same width as that of the suction roller 20. The diameters of the first press roller 11, the second press roller 51, and the third press roller 52 may be set as appropriate.

The manufacturing apparatus 1 is further provided with a support film unwinding roller 55 and a membrane assembly winding roller 56. The support film unwinding roller 55 has the support film 7 wound therearound, and continuously sends out that support film 7. As the support film 7, it is possible to use a resin film having high mechanical strength and an excellent shape-retaining function such as a PEN (polyethylene naphthalate) film and a PET (polyethylene terephthalate) film. In other words, the support film 7 may be the same as the backsheet 6, and the backsheet 6 that has been separated by the separation part 10 and wound by the backsheet winding roller 14 may be sent out as the support film 7 from the support film unwinding roller 55. Alternatively, the support film 7 may be a one-side slightly self-adhesive film obtained by applying an adhesive to one side (the side attached to the electrolyte membrane 2) of the above resin film.

The support film 7 that has been sent out from the support film unwinding roller 55 is suspended on the third press roller 52. Meanwhile, the electrolyte membrane 2 having the catalyst layer formed thereon after the dry process is separated from the suction roller 20 by the second press roller 51 and suspended on the second press roller 51. Then, the support film 7 is pressed against and attached to the second side of the electrolyte membrane 2 by the second press roller 51 and the third press roller 52. Through this step, the catalyst-coated membrane 5 with the support film 7 is manufactured.

The catalyst-coated membrane 5 with the support film 7 is wound by the membrane assembly winding roller 56. The membrane assembly winding roller 56 winds the catalyst-coated membrane 5 and provides a constant tension to the electrolyte membrane 2 that is suspended on the second press roller 51 away from the suction roller 20. The manufacturing apparatus 1 includes an additional drying furnace 49 between the attachment part 50 and the membrane assembly winding roller 56. The catalyst-coated membrane 5 to which the support film 7 has been attached by the attachment part 50 passes through the additional drying furnace 49 before being wound by the membrane assembly winding roller 56. Any known hot air drying furnace can be used as the additional drying furnace 49. Finish drying of the catalyst layer is carried out by the catalyst-coated membrane 5 with the support film 7 passing through the inside of the additional drying furnace 49.

The manufacturing apparatus 1 also includes an air jetting part 60. The air jetting part 60 is provided between the attachment part 50 and the separation part 10. The air jetting part 60 includes a mechanism for jetting air toward the suction roller 20 and a mechanism for sucking the surrounding atmosphere. The air jetted by the air jetting part 60 is cooled to about 5° C., for example. Since the air jetting part 60 is provided between the attachment part 50 and the separation part 10, it blows air to the outer surface of the suction roller 20 on which the electrolyte membrane 2 is not sucked.

The outer surface of the suction roller 20 is cooled by the air jetting part 60 blowing the cooled air to the suction roller 20. In addition, any foreign substance adhering to the outer surface of the suction roller 20 can be removed by the air jetting part 60 blowing air to the suction roller 20 and sucking the surrounding atmosphere.

The manufacturing apparatus 1 further includes a control part 90 that controls various mechanisms provided in the apparatus. The hardware configuration of the control part 90 is the same as a commonly used computer. More specifically, the control part 90 includes a CPU that performs various types of computational processing, a ROM that is a read-only memory for storing a basic program, a RAM that is a readable and writable memory for storing various types of information, and a magnetic disk for storing control software, data and the like. The various operation mechanisms provided in the manufacturing apparatus 1 are controlled by the CPU of the control part 90 executing a predetermined processing program, and thereby the manufacturing process of the catalyst-coated membrane 5 proceeds.

Figure 5:
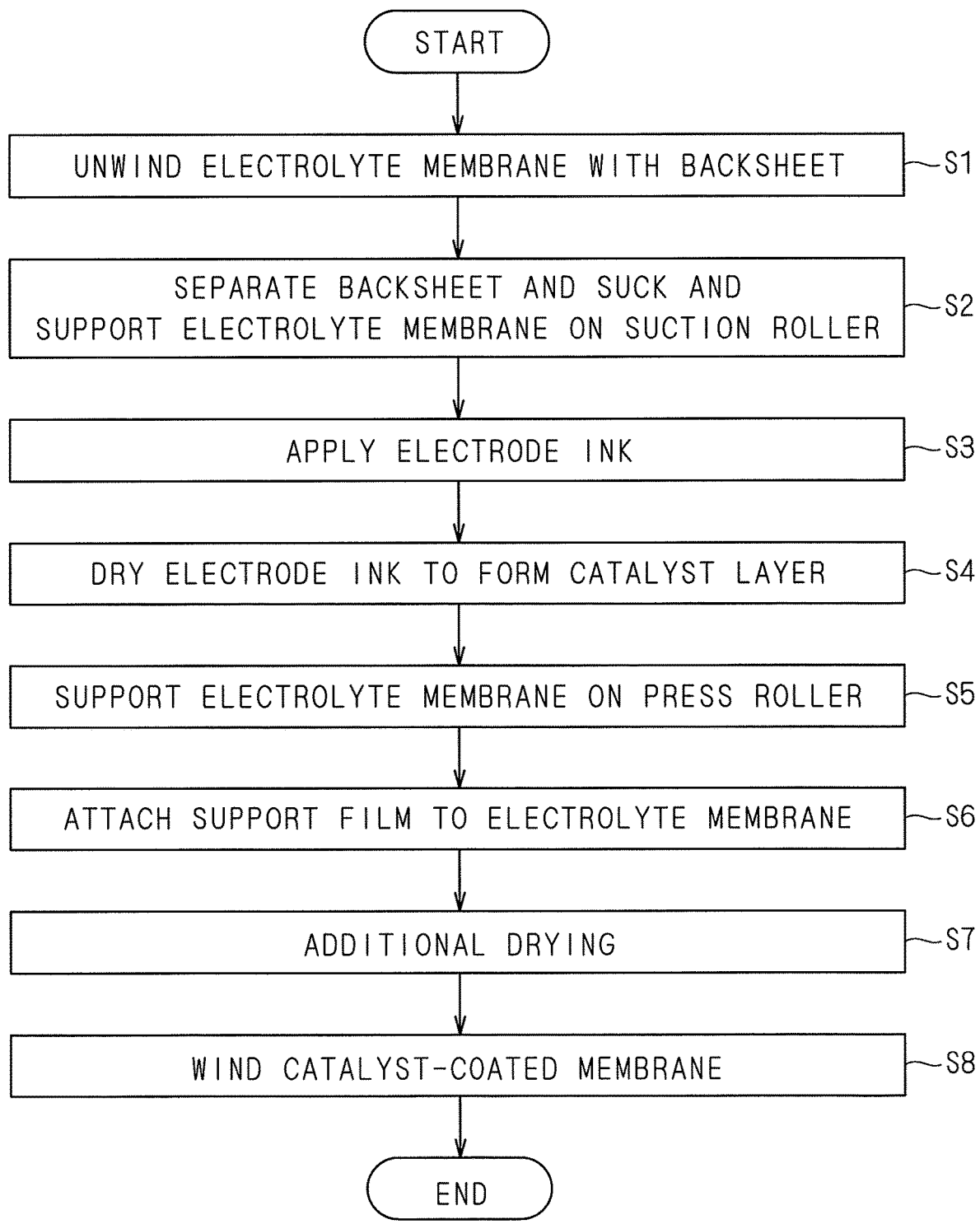
FIG. 5 is a flowchart illustrating a procedure of manufacturing a catalyst-coated membrane performed by the manufacturing apparatus of FIG. 1.

Next, a description will be given of the procedure of processing performed by the manufacturing apparatus 1 for a composite membrane that has the above-described configuration. FIG. 5 is a flowchart illustrating a procedure through which the catalyst-coated membrane 5 is manufactured by the manufacturing apparatus 1. The following procedure for manufacturing the catalyst-coated membrane 5 proceeds by the control part 90 controlling various operation mechanisms of the manufacturing apparatus 1.

First, the electrolyte membrane unwinding roller 12 unwinds the electrolyte membrane 2 with the backsheet 6 (step S1). As described above, since the electrolyte membrane 2 for use in polymer electrolyte fuel cells is very easily deformed with a low amount of moisture contained in the air, the backsheet 6, which is a band-shaped resin film for shape retention, is attached to the electrolyte membrane 2 at the stage of winding the electrolyte membrane 2 during manufacture. The backsheet 6 is attached to the first side of the electrolyte membrane 2. The electrolyte membrane 2 with the backsheet 6 that has been continuously pulled out from the electrolyte membrane unwinding roller 12 is suspended on the auxiliary roller 13 and sent out to the first press roller 11 of the separation part 10.

In the separation part 10, the second side of the electrolyte membrane 2 with the backsheet 6 is pressed against the suction roller 20 by the first press roller 11, thereby separating the backsheet 6 and causing the electrolyte membrane 2 to be sucked and supported by the suction roller 20 (step S2). In other words, the first press roller 11 separates the backsheet 6, with the second side of the electrolyte membrane 2 being sucked onto the suction roller 20. FIG. 6 is a diagram showing how the backsheet 6 is separated and the electrolyte membrane 2 is sucked onto the suction roller 20 by the first press roller 11. The backsheet 6 is separated from the electrolyte membrane 2 at a position between the first press roller 11 and the suction roller 20, and the electrolyte membrane 2 is sucked onto the suction roller 20.

The first press roller 11 presses the electrolyte membrane 2 against the suction roller 20 with a force in such a range that the electrolyte membrane 2 having low strength can be reliably sucked onto the outer surface of the suction roller 20 without being deformed. Note that the first press roller 11 is installed at a position close to and spaced a predetermined interval from the outer surface of the suction roller 20. The force with which the first press roller 11 presses the electrolyte membrane 2 with the backsheet 6 against the suction roller 20 is adjustable by changing this interval.

The suction roller 20 sucks the second side of the electrolyte membrane 2. By applying a negative pressure of 90 kPa or more to the suction port 21 of the suction roller 20 that is formed of porous ceramics having a porosity of 15 to 50%, a negative pressure of 10 kPa or more uniformly acts on the outer surface, regardless of whether the suction roller 20 is sucking the electrolyte membrane 2. Accordingly, the suction roller 20 can stably suck and support the electrolyte membrane 2 at a fixed suction pressure, regardless of the size of the width of the electrolyte membrane 2. Additionally, it is possible to inhibit deformation of the electrolyte membrane 2 due to suction by the suction roller 20.

Furthermore, since the surface roughness of the outer surface of the suction roller 20 is 5 μm or less in terms of Rz and the pore diameter of the suction roller 20 is 5 μm or less, a suction trace resulting from suction support is unlikely to occur in the electrolyte membrane 2. In other words, the suction roller 20 according to the present embodiment can stably suck and support the electrolyte membrane 2 having fragile mechanical properties without causing deformation or a suction trace.

As shown in FIG. 6, the suction roller 20 sucking and supporting the electrolyte membrane 2 rotates about the central axis extending in the Y-axis direction as the center of rotation, and thereby, the electrolyte membrane 2 from which the backsheet 6 has been separated is transported while being supported on the outer surface of the suction roller 20. On the other hand, the backsheet 6 that has been separated from the electrolyte membrane 2 is wound by the backsheet winding roller 14.

Next, the electrode ink is applied from the coating nozzle 30 to the first side of the electrolyte membrane 2 that is transported while being sucked and supported on the suction roller 20 (step S3). The electrode ink to be applied to the electrolyte membrane 2 of a polymer electrolyte fuel cell contains, for example, particles of a catalyst such as platinum or a platinum alloy, an ion-conducting electrolyte, and a dispersion medium. The electrode ink to be applied may be either a cathode electrode ink or an anode electrode ink.

Figure 7:
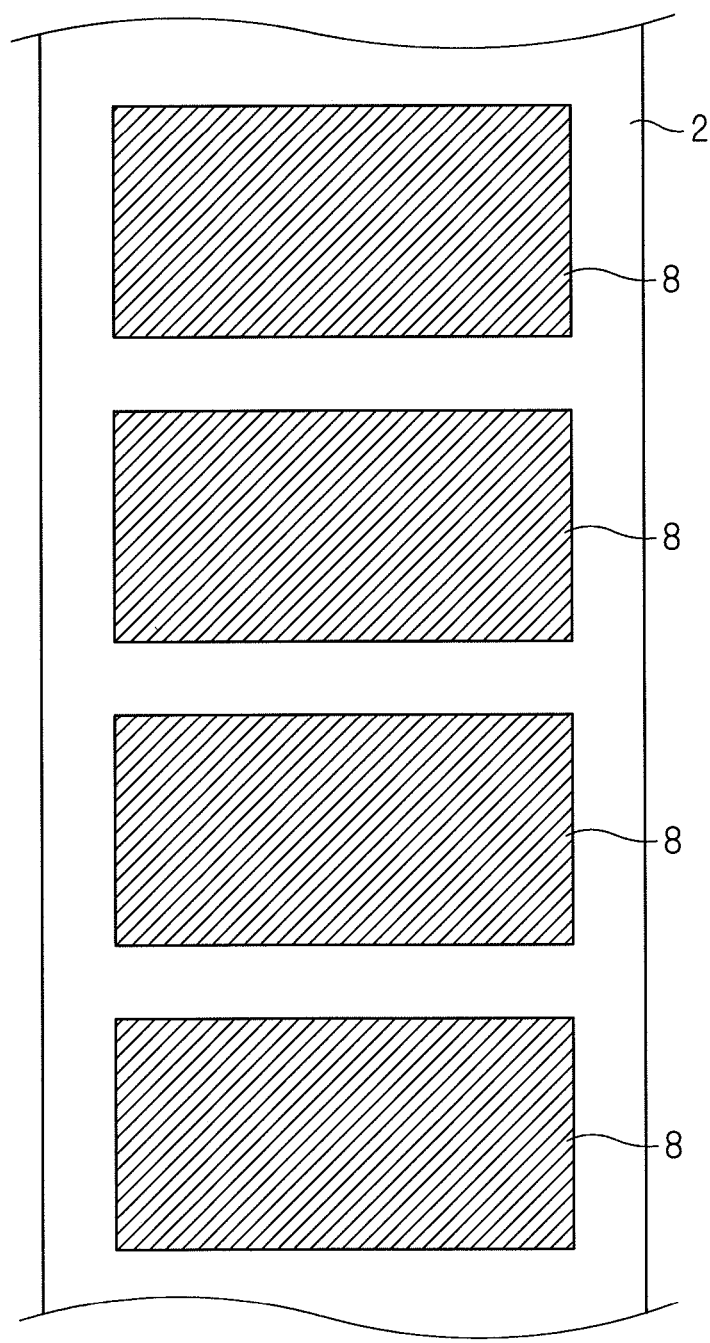
FIG. 7 is a diagram showing a state in which an electrode ink has been intermittently applied to the electrolyte membrane.

In the present embodiment, the coating liquid supply mechanism 35 intermittently supplies the electrode ink to the coating nozzle 30, thereby intermittently applying the electrode ink from the coating nozzle 30 to the first side of the electrolyte membrane 2 that is transported while being sucked and supported on the suction roller 20. FIG. 7 is a diagram showing a state in which the electrode ink has been intermittently applied to the electrolyte membrane 2. FIG. 8 is a cross-sectional view of the electrolyte membrane 2 having the electrode ink intermittently applied thereto. By intermittently ejecting the electrode ink though the coating nozzle 30 onto the electrolyte membrane 2 that is transported at a fixed speed while being sucked and supported on the suction roller 20, the electrode ink layers 8 having a constant size are discontinuously formed at predetermined intervals on the first side of the electrolyte membrane 2 as shown in FIGS. 7 and 8.

Since the total runout of the suction roller 20 during rotation is 10 μm or less and the surface roughness of the outer surface of the suction roller 20 is 5 μm or less in terms of Rz, the interval between the outer surface of the rotating suction roller 20 and the slit-shaped discharge port of the coating nozzle 30 is stable at a substantially constant value. Thus, it is possible to form uniform electrode ink layers 8 with high precision through intermittent coating from the coating nozzle 30.

The width of each of the electrode ink layers 8 formed on the first side of the electrolyte membrane 2 is defined by the width of the slit-shaped discharge port of the coating nozzle 30. The length of each of the electrode ink layers 8 is defined by the electrode ink ejection time of the coating nozzle 30 and the transport speed of the electrolyte membrane 2 (i.e., the rotational speed of the suction roller 20). The thickness (height) of the electrode ink layers 8 is defined by the distance between the discharge port of the coating nozzle 30 and the first side of the electrolyte membrane 2 as well as the ejection flow rate of the ejection electrode ink and the transport speed of the electrolyte membrane 2. For example, the thickness is in the range of 10 to 300 μm. The electrode ink is a paste that can be applied from the coating nozzle 30, and has a degree of viscosity that can maintain the shape of the electrode ink layers 8 on the electrolyte membrane 2.

Then, the electrode ink layers 8 are transported to positions opposing the drying furnace 40 by the rotation of the suction roller 20 and are subjected to a dry process (step S4). The dry process of the electrode ink layers 8 is carried out by blowing hot air from the drying furnace 40 to the electrode ink layers 8. As a result of the hot air being blown to the electrode ink layers 8, the electrode ink layers 8 are heated to volatilize the solvent component and are dried. The volatilization of the solvent component causes the electrode ink layers 8 to be dried into catalyst layers 9. Note that in the present embodiment, since the additional drying furnace 49 is provided for the final finish drying, it is sufficient that the electrode ink layers 8 are dried in the drying furnace 40 to the extent that no ink from the catalyst layer 9 will adhere to the second press roller 51.

FIG. 9 is a cross-sectional view of the electrolyte membrane 2 having the catalyst layers 9 formed thereon. The catalyst layers 9 are electrode layers in which catalyst particles of platinum or the like are supported. The catalyst layers 9 are formed as a result of solidification of the solvent component that has been volatilized from the electrode ink layers 8, and therefore have a thickness smaller than that of the electrode ink layers 8. The thickness of the dried catalyst layers 9 is in the range of 3 to 50 μm, for example.

The drying furnace 40 includes the three drying zones 41, 42, and 43, and blasts of hot air having different temperatures are blown therefrom. Specifically, the hot air temperature sequentially increases in order from the drying zone 41 located on the most upstream side through the intermediate drying zone 42 to the drying zone 43 on the most downstream side in the transport direction of the electrolyte membrane 2 by the suction roller 20. If the drying furnace 40 is not divided into drying zones and high-temperature hot air is immediately blown to the electrode ink layers 8 immediately after coating, the electrode ink layers 8 will be rapidly dried, which may cause cracking in the surface. This is also the case when the electrode ink layers 8 immediately after coating are rapidly dried with a heater built into the suction roller 20.

In the present embodiment, the drying furnace 40 is divided into the three drying zones 41, 42, and 43, and the drying temperatures are sequentially increased in order from the upstream side toward the downstream side in the transport direction of the electrolyte membrane 2. That is, the drying zone 41 on the most upstream side slightly increases the temperature of the electrode ink layers 8 by blowing hot air having a relatively low temperature to the electrode ink layers 8 immediately after coating. Next, the intermediate drying zone 42 gradually dries the electrode ink layers 8 by blowing hot air having a rather high temperature. Then, the drying zone 43 on the most downstream side strongly dries the electrode ink layers 8 by blowing high-temperature hot air. By gradually increasing the drying temperature in this way to dry the electrode ink layer 8 stepwise, it is possible to prevent the occurrence of cracking during the dry process.

To appropriately dry the electrode ink layers 8 while preventing the occurrence of cracking, it is also necessary to appropriately manage the dry process time. Preferably, the dry process time is about 60 seconds, for example. The dry process time is a total time required for a single electrode ink layer 8 to pass through the three drying zones 41, 42, and 43. For example, assuming that the diameter of the suction roller 20 is 400 mm and the three drying zones 41, 42, and 43 cover halfway around the outer surface of the suction roller 20, the length of the drying zones 41, 42, and 43 is about 628 mm. To ensure 60 seconds as the dry process time under this condition, the transport speed of the electrolyte membrane 2 may be set to 10.4 mm/sec. The transport speed of the electrolyte membrane 2 is defined by the rotational speed of the suction roller 20.

The drying furnace 40 further includes the heat-shielding zone 44 on the most upstream side and the heat-shielding zone 45 on the most downstream side in the transport direction of the electrolyte membrane 2. This makes it possible to prevent the hot air blown out from the drying zones 41, 42, and 43 from flowing beyond the drying furnace 40 to the upstream and downstream sides of the suction roller 20. As a result, it is possible to prevent unnecessarily heating of the coating nozzle 30 located on the upstream side of the drying furnace 40 and the attachment part 50 located on the downstream side.

Besides the heat-shielding zones 44 and 45, the drying furnace 40 is also provided with the suction parts 46 and 47, which make it possible to prevent hot air from flowing out to the surroundings of the drying furnace 40 and to prevent the leakage of the vapor or the like of the solvent volatilized from the electrode ink layers 8 during drying.

Next, the dried catalyst layer 9 reaches the attachment part 50 by further rotation of the suction roller 20. When the electrolyte membrane 2 having the catalyst layer 9 formed thereon has reached the attachment part 50, the electrolyte membrane 2 is separated from the suction roller 20 and suspended by the second press roller 51. That is, the second side of the electrolyte membrane 2 is separated from the outer surface of the suction roller 20, and the first side of the electrolyte membrane 2 is brought into contact with and supported by the outer surface of the second press roller 51 (step S5). At this time, the catalyst layers 9 that have been formed on the electrolyte membrane 2 come into contact with the second press roller 51. On the other hand, the support film 7 that has been sent out from the support film unwinding roller 55 is suspended on the third press roller 52.

The second press roller 51 and the third press roller 52 are provided at a predetermined interval, and the interval is smaller than the total thickness of the electrolyte membrane 2, the catalyst layers 9, and the support film 7. Accordingly, the support film 7 is pressed against and attached to the second side of the electrolyte membrane 2 when the electrolyte membrane 2 and the support film 7 pass between the second press roller 51 and the third press roller 52 (step S6).

Figure 10:
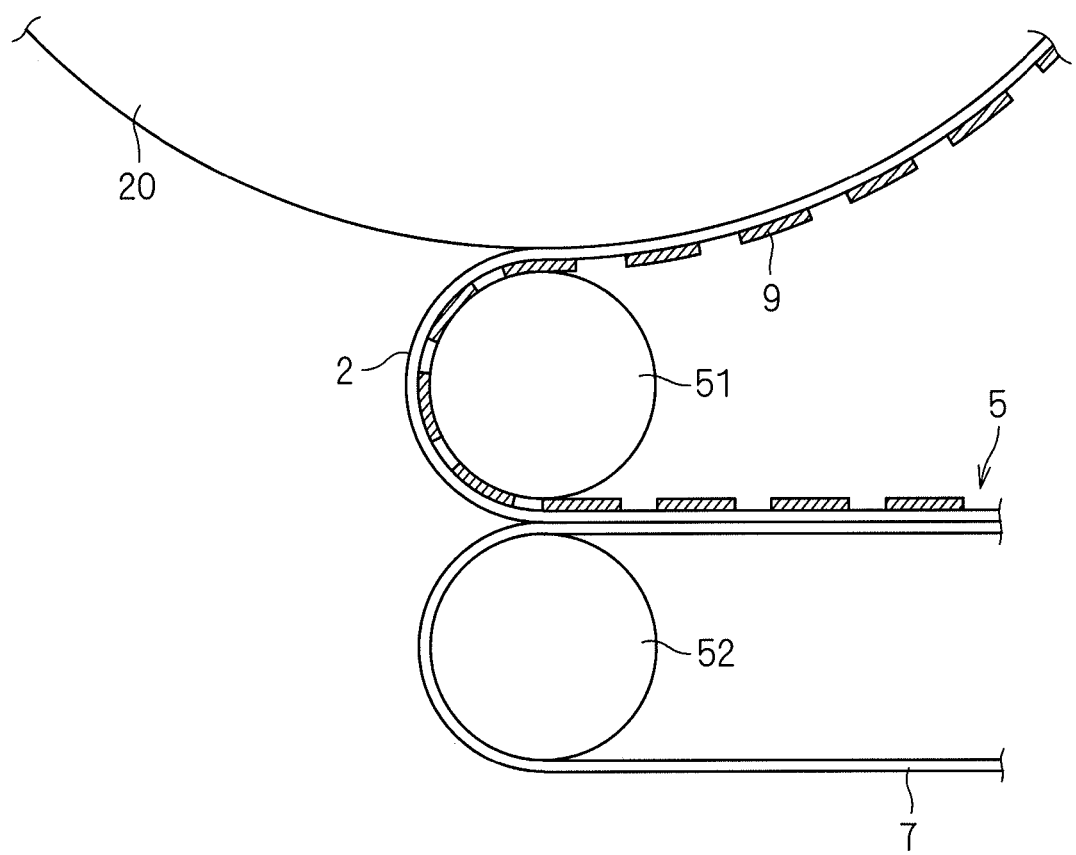
FIG. 10 is a diagram showing how a support film is attached to the electrolyte membrane by a second press roller and a third press roller.

FIG. 10 is a diagram showing how the support film 7 is attached to the electrolyte membrane 2 by the second press roller 51 and the third press roller 52. The second side of the electrolyte membrane 2 wound on the second press roller 51 and the support film 7 wound on the third press roller 52 come into contact with each other. The force with which the support film 7 is pressed against the second side of the electrolyte membrane 2 at this time is defined by the interval between the second press roller 51 and the third press roller 52. Since the electrolyte membrane 2 has a certain degree of viscosity on its surface, the support film 7 can be attached to the electrolyte membrane 2 by pressing the support film 7 against the second side of the electrolyte membrane 2 even if the support film 7 is a resin film such as PEN. If the support film 7 is a one-side slightly self-adhesive film having an adhesive applied to one side, the support film 7 can be more reliably attached to the electrolyte membrane 2.

By attaching the support film 7 to the second side of the electrolyte membrane 2, the catalyst-coated membrane 5 with the support film 7 is manufactured. The catalyst-coated membrane 5 is transported by being wound by the membrane assembly winding roller 56. In this process, the catalyst-coated membrane 5 with the support film 7 passes through the inside of the additional drying furnace 49. Thereby, the final finish drying of the catalyst layers 9 is performed (step S7). Even if the catalyst layers 9 are not sufficiently dried in the drying furnace 40, the catalyst layers 9 can be reliably dried by the additional drying furnace 49. The catalyst-coated membrane 5 with the support film 7 that has passed through the additional drying furnace 49 is wound by the membrane assembly winding roller 56, and thereby, a series of the steps of manufacturing the catalyst-coated membrane 5 is completed (step S8).

In the manufacturing apparatus 1 described above, the drying furnace 40 is provided so as to cover a portion of the outer surface of the suction roller 20, and hot air is blown to the outer surface of the suction roller 20 for drying the electrode ink layers 8. Accordingly, the suction roller 20 formed of porous ceramics gradually stores heat and undergoes a temperature rise. When the suction roller 20 is heated to a high temperature exceeding a predetermined value, the electrode ink applied to the electrolyte membrane 2 from the coating nozzle 30 is immediately heated and rapidly dried, which may cause cracking in the surfaces of the electrode ink layers 8.

For this reason, the suction roller 20 is provided with the plurality of water-cooled tubes 22 (FIG. 3). The suction roller 20 is cooled by flowing constant-temperature water through the water-cooled tubes 22, thereby preventing the suction roller 20 from being heated to a temperature higher than or equal to the predetermined value. However, the suction roller 20 formed of porous ceramics may have low heat conduction. Moreover, since the drying furnace 40 blows hot air onto the outer surface of the suction roller 20, it may not be possible to sufficiently suppress an increase in the temperature of the outer surface.

Even in such a case, the outer surface of the suction roller 20 that has stored heat due to hot air from the drying furnace 40 can be cooled to remove heat by blowing cooling air from the air jetting part 60 (FIG. 2) toward the outer surface of the suction roller 20. This makes it possible to prevent immediate heating of the electrode ink applied from the coating nozzle 30 to the electrolyte membrane 2. In addition, any foreign substance adhering to the outer surface of the suction roller 20 can be removed by the air jetting part 60 blowing air to the suction roller 20 and sucking the surrounding atmosphere.

In the first preferred embodiment, the electrolyte membrane 2 with the backsheet 6 is sent out from the electrolyte membrane unwinding roller 12, and the backsheet 6 is separated, with the second side of the electrolyte membrane 2 being sucked on the suction roller 20 by the first press roller 11. Then, the electrolyte membrane 2 is transported while being sucked and supported on the suction roller 20, so that the electrode ink is applied to the first side of the electrolyte membrane 2 to form the electrode ink layers 8, which are then dried by a blast of hot air into catalyst layers 9. Thereafter, the support film 7 is attached to the second side of the electrolyte membrane 2 in a state in which the outer surface of the second press roller 51 disposed close to the suction roller 20 is brought into contact with and supported on the first side of the electrolyte membrane 2.

Accordingly, the electrolyte membrane 2, which is transported roll-to-roll from the electrolyte membrane unwinding roller 12 via the suction roller 20 to the membrane assembly winding roller 56, is always continuously supported by some member. Specifically, in the initial state, the first side of the electrolyte membrane 2 is supported by the backsheet 6. When the backsheet 6 is separated, the second side of the electrolyte membrane 2 is supported by the outer surface of the suction roller 20. When the electrolyte membrane 2 is separated from the suction roller 20 after drying of the catalyst layers 9, the first side of the electrolyte membrane 2 is supported by the second press roller 51. Furthermore, in a state in which the first side of the electrolyte membrane 2 is in contact with and supported on the outer surface of the second press roller 51, the support film 7 is attached to the second side of the electrolyte membrane 2 and all are wound on the membrane assembly winding roller 56.

As previously described, the electrolyte membrane 2 used in the manufacturing apparatus 1 is very thin and low in mechanical strength, and has the characteristics of easily undergoing swelling even with a small amount of moisture in the air, and also undergoing shrinkage with decreasing humidity. Therefore, the electrolyte membrane 2 is highly likely to undergo deformation. If the electrode ink is applied to the electrolyte membrane 2 that is not supported by any member, the solvent contained in the electrode ink will cause the electrolyte membrane 2 to swell, and the electrolyte membrane 2 will also undergo shrinkage when the electrode ink is dried. When the catalyst layers 9 are not sufficiently dried in the drying furnace 40, the electrolyte membrane 2 may undergo swelling and shrinkage even after the dry process in the drying furnace 40. If the electrolyte membrane 2 undergoes swelling and shrinkage, there is the possibility that creases and pinholes are generated in the electrolyte membrane 2. That is, the swelling and shrinkage of the electrolyte membrane 2 tend to occur especially after the application of the electrode ink containing the solvent, posing the problem of the generation of creases and pinholes. Generation of such creases and pinholes in the electrolyte membrane 2 can lead to a reduction in the power generation performance of the fuel cell.

In the present embodiment, the electrolyte membrane 2 is sucked and supported by the suction roller 20 at the time of applying the electrode ink, and the electrolyte membrane 2 is continuously supported by the second press roller 51 and the support film 7 even after the electrolyte membrane 2 is subsequently separated from the suction roller 20. Accordingly, it is possible to inhibit deformation due to swelling and shrinkage of the electrolyte membrane 2 throughout transport after the application of the electrode ink, thus preventing the generation of creases and pinholes. As a result, it is possible to prevent a reduction in the power generation performance of a fuel cell that uses the catalyst-coated membrane 5 manufactured by the manufacturing apparatus 1 according to the present invention.

With the manufacturing apparatus 1, the electrolyte membrane 2 is always continuously supported by some member not only during and after the application of the electrode ink, but also from when the electrolyte membrane 2 is sent out from the electrolyte membrane unwinding roller 12 until it is wound by the membrane assembly winding roller 56. Accordingly, it is possible to inhibit deformation of the electrolyte membrane 2 due to swelling and shrinkage throughout a series of the steps of manufacturing the catalyst-coated membrane 5, thus preventing the generation of creases and pinholes.

2. Second Preferred Embodiment

Next, a second preferred embodiment of the present invention will be described. Although the catalyst layers 9 are formed by applying the electrode ink to one side of the electrolyte membrane 2 in the first preferred embodiment, the second preferred embodiment describes a case in which the catalyst layers 9 are formed by applying the electrode ink to the opposite side of the electrolyte membrane 2 having the catalyst layers 9 formed on one side thereof. By forming anode and cathode catalyst layers 9 on both sides of the electrolyte membrane 2, the electrolyte membrane 2 functions as a catalyst-coated membrane 5 of a polymer electrolyte fuel cell.

Figure 11:
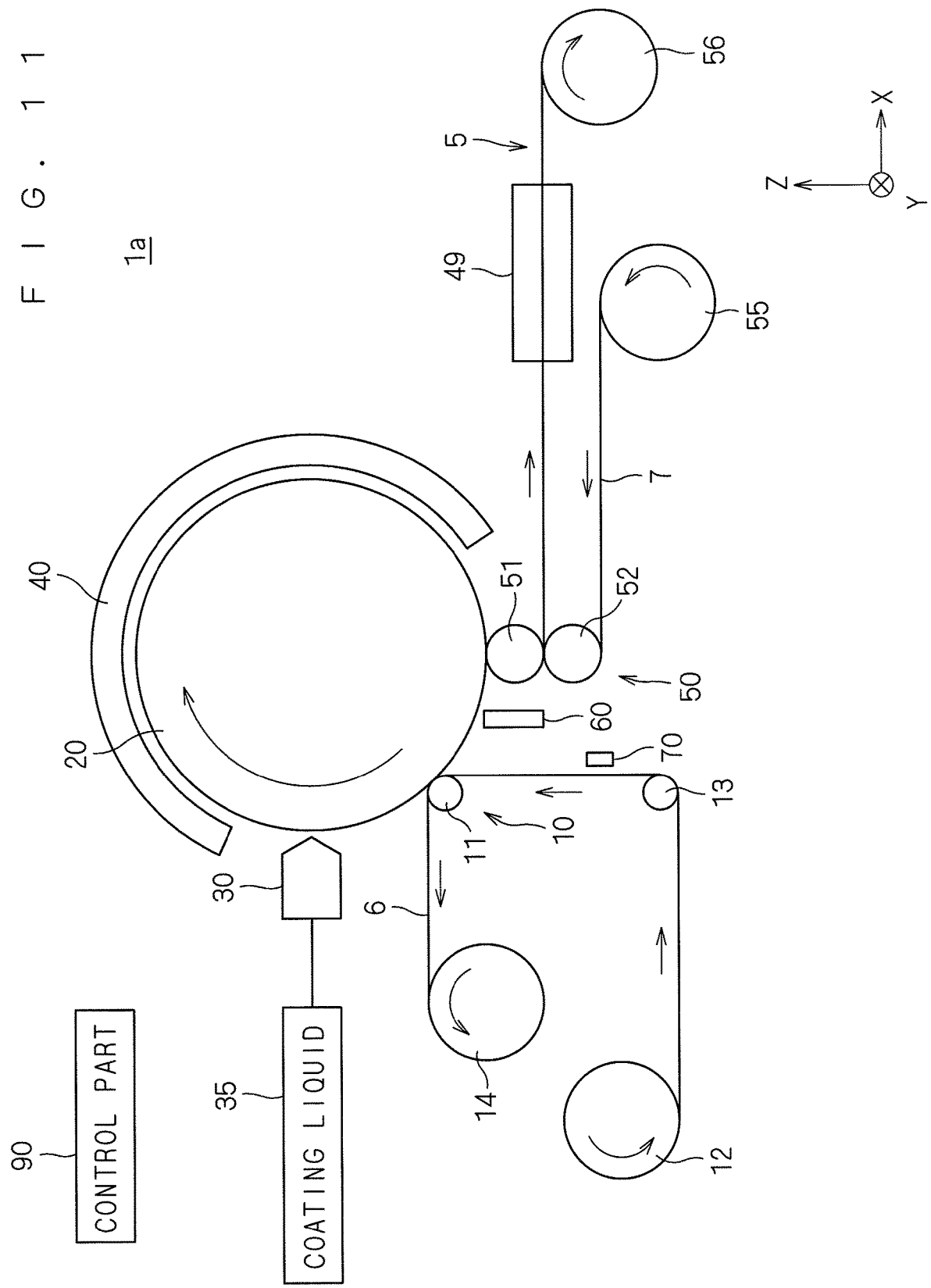
FIG. 11 is a side view of a manufacturing apparatus for a composite membrane according to a second preferred embodiment.

FIG. 11 is a side view of a manufacturing apparatus 1a for a composite membrane according to the second preferred embodiment. In FIG. 11, constituent elements that are the same as those in the first preferred embodiment are denoted by the same reference numerals. The manufacturing apparatus 1a of the second preferred embodiment is different from the manufacturing apparatus 1 of the first preferred embodiment in that it includes an image processing unit 70. The image processing unit 70 is provided at any position between the electrolyte membrane unwinding roller 12 and the first press roller 11 of the separation part 10 (in the second preferred embodiment, at a position between the auxiliary roller 13 and the first press roller 11). The image processing unit 70 includes an imaging camera and an image data analyzer, and uses the imaging camera to image the surface of the electrolyte membrane 2 that is sent out from the electrolyte membrane unwinding roller 12 and transported toward the separation part 10. The image processing unit 70 performs predetermined image processing on image data obtained by imaging performed by the imaging camera and specifies positions at which the catalyst layers 9 are to be formed on the electrolyte membrane 2. The result of the analysis by the image processing unit 70 is transmitted to the control part 90. The rest of the configuration of the manufacturing apparatus 1a of the second preferred embodiment other than the image processing unit 70 is the same as that of the manufacturing apparatus 1 of the first preferred embodiment.

The procedure of processing performed by the manufacturing apparatus 1a of the second preferred embodiment is also the same as that in the first preferred embodiment (see FIG. 5). However, in the second preferred embodiment, the electrode ink is applied to the opposite side of the electrolyte membrane 2 having the catalyst layer 9 already formed on one side. Accordingly, an electrolyte membrane obtained by attaching the backsheet 6 to the opposite side of the electrolyte membrane 2 having the catalyst layer 9 formed on one side is wound around the electrolyte membrane unwinding roller 12. For example, an electrolyte membrane that is obtained by attaching the support film 7 to the second side of the electrolyte membrane 2 having the catalyst layer 9 formed on the first side and is wound by the membrane assembly winding roller 56 in the first preferred embodiment may be directly unwound from the electrolyte membrane unwinding roller 12. The support film 7 and the backsheet 6 may be the same film, and the catalyst-coated membrane 5 manufactured in the first preferred embodiment may be directly used as a material that is unwound from the electrolyte membrane unwinding roller 12 in the second preferred embodiment.

Figure 12:
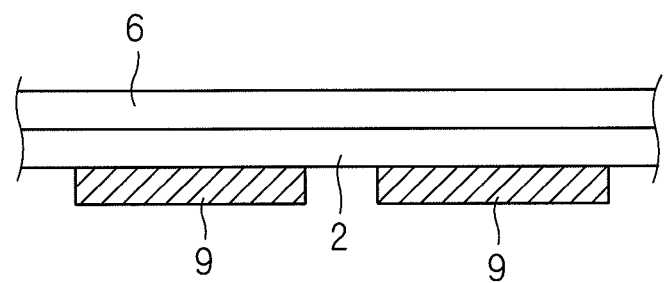
FIG. 12 is a cross-sectional view of an electrolyte membrane with a backsheet that has been unwound from an electrolyte membrane unwinding roller in the second preferred embodiment.

FIG. 12 is a cross-sectional view of the electrolyte membrane 2 with the backsheet 6 that has been unwound from the electrolyte membrane unwinding roller 12. The electrolyte membrane 2 has catalyst layers 9 intermittently formed on the first side thereof, and the backsheet 6 attached to the second side thereof. The electrolyte membrane 2 with the backsheet 6 that has been continuously pulled out from the electrolyte membrane unwinding roller 12 is suspended on the auxiliary roller 13 and sent out to the first press roller 11 of the separation part 10.

In the process in which the electrolyte membrane 2 is sent out from the electrolyte membrane unwinding roller 12 to the separation part 10, the first side of the electrolyte membrane 2 is imaged by the image processing unit 70, and positions at which the catalyst layers 9 are to be formed on the electrolyte membrane 2 is specified by image processing. The forming positions of the catalyst layers 9 that have been specified by the image processing unit 70 is transmitted to the control part 90. The image processing unit 70 images the first side of the electrolyte membrane 2 either continuously or intermittently in a short cycle, and specifies the forming positions of all catalyst layers 9.

In the separation part 10, the first side of the electrolyte membrane 2 is pressed against the suction roller 20 by the first press roller 11, and thereby the backsheet 6 is separated from the second side and the electrolyte membrane 2 is sucked and supported on the suction roller 20. In other words, the first press roller 11 separates the backsheet 6 from the second side with the first side of the electrolyte membrane 2 being sucked on the suction roller 20. When the catalyst-coated membrane 5 manufactured in the first preferred embodiment is directly used in the second preferred embodiment, the electrolyte membrane 2 is sucked and supported on the suction roller 20, with the front and back sides being inverted.

The suction roller 20 on which the first side of the electrolyte membrane 2 is sucked and supported is rotated around the central axis along the Y-axis direction as the center of rotation, and thereby the electrolyte membrane 2 from which the backsheet 6 has been separated is transported while being supported on the outer surface of the suction roller 20. On the other hand, the backsheet 6 that has been separated from the electrolyte membrane 2 is wound by the backsheet winding roller 14.

Next, an electrode ink is applied from the coating nozzle 30 to the second side of the electrolyte membrane 2 that is transported while being sucked and supported on the suction roller 20. In the second preferred embodiment, an electrode ink of opposite polarity to that of the catalyst layer 9 already formed on the first side of the electrolyte membrane 2 is applied to the second side. For example, when cathode catalyst layers 9 have been formed on the first side of the electrolyte membrane 2, an anode electrode ink is applied to the second side of the electrolyte membrane 2. Conversely, when anode catalyst layers 9 have been formed on the first side of the electrolyte membrane 2, a cathode electrode ink is applied to the second side of the electrolyte membrane 2.

In the second preferred embodiment, on the basis of the result of the specification of the forming positions of the catalyst layers 9 by the image processing unit 70, the control part 90 performs coating control so that the electrode ink is intermittently applied from the coating nozzle 30 to the second side of the electrolyte membrane 2 at positions corresponding to the forming positions of the catalyst layers 9. Specifically, for the positioning of the electrolyte membrane 2 in the transport direction, the control part 90 controls the ejection timing of the electrode ink from the coating nozzle 30. For the positioning of the electrolyte membrane 2 in the width direction, the control part 90 adjusts the Y-axial position of the coating nozzle 30.

Figure 13:
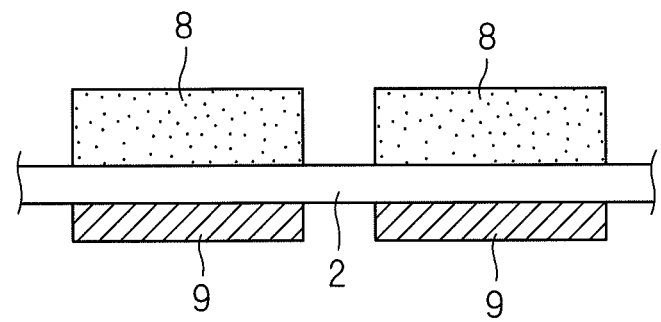
FIG. 13 is a cross-sectional view of the electrolyte membrane having an electrode ink intermittently applied to a side opposite to the side corresponding to the catalyst layer.

FIG. 13 is a cross-sectional view of an electrolyte membrane 2 having an electrode ink intermittently applied the side opposite to the side corresponding to the catalyst layer 9. As shown in FIG. 13, the electrode ink is applied to the second side of the electrolyte membrane 2 at positions corresponding to the positions at which the catalyst layers 9 have been formed on the first side, and thereby electrode ink layers 8 are formed. Note that the positions of the electrode ink layers 8 formed on the second side of the electrolyte membrane 2 do not necessarily have to completely correspond to the forming positions of the catalyst layers 9, and may be displaced slightly.

Then, the electrode ink layers 8 are transported to the positions opposing the drying furnace 40 by rotation of the suction roller 20, and a dry process is performed on the electrode ink layers 8. The dry process of the electrode ink layers 8 is the same as that in the first preferred embodiment, and is carried out by blowing hot air from the drying furnace 40 to the electrode ink layers 8. As a result of the hot air being blown to the electrode ink layers 8, the electrode ink layers 8 are heated to volatilize the solvent component and are thereby dried. The volatilization of the solvent component causes the electrode ink layers 8 to be dried into catalyst layers 9.

The hot air temperatures (drying temperatures) of the three drying zones 41, 42, and 43 of the drying furnace 40 sequentially increase in order from the upstream side toward the downstream side in the transport direction of the electrolyte membrane 2 by the suction roller 20. This allows the electrode ink layers 8 to be dried stepwise, making it possible to prevent the occurrence of cracking during the dry process.

Figure 14:
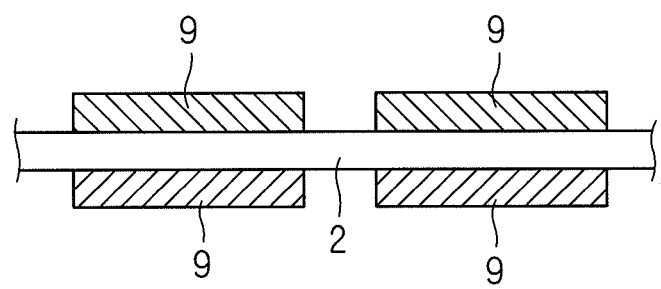
FIG. 14 is a cross-sectional view of the electrolyte membrane having catalyst layers formed on both sides.

FIG. 14 is a cross-sectional view of an electrolyte membrane having catalyst layers 9 formed on both sides. Catalyst layers 9 are formed on the first side of the electrolyte membrane 2, and catalyst layers 9 of opposite polarity are formed on the second side. The catalyst layers 9 on the second side are formed at the positions corresponding to the forming positions of the catalyst layers 9 on the first side. Accordingly, the electrolyte membrane 2 is sandwiched between the cathode catalyst layers 9 and the anode catalyst layers 9 as shown in FIG. 14.

Next, the dried catalyst layers 9 reach the attachment part 50 by further rotation of the suction roller 20. When the electrolyte membrane 2 having the catalyst layers 9 formed on the second side has reached the attachment part 50, the electrolyte membrane 2 is separated from the suction roller 20 and suspended on the second press roller 51. That is, the first side of the electrolyte membrane 2 is separated from the outer surface of the suction roller 20, and the second side of the electrolyte membrane 2 is brought into contact with and supported by the outer surface of the second press roller 51. Meanwhile, the support film 7 that has been sent out from the support film unwinding roller 55 is suspended on the third press roller 52.

Figure 15:
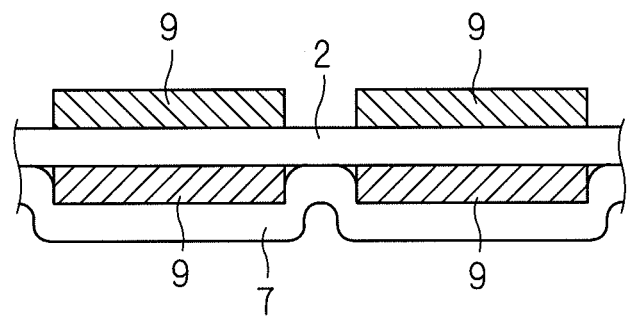
FIG. 15 is a cross-sectional view of the electrolyte membrane having a support film attached thereto.

When the electrolyte membrane 2 having the catalyst layers 9 formed on both sides and the support film 7 pass between the second press roller 51 and the third press roller 52, the support film 7 is pressed against and attached to the first side of the electrolyte membrane 2. FIG. 15 is a cross-sectional view of an electrolyte membrane 2 having the support film 7 attached thereto. The first side of the electrolyte membrane 2 that is wound on the second press roller 51, and the support film 7 that is wound on the third press roller 52 come into contact with each other. The force with which the support film 7 is pressed against the first side of the electrolyte membrane 2 at this time is defined by the interval between the second press roller 51 and the third press roller 52. By pressing the support film 7 against the first side of the electrolyte membrane 2, the support film 7 is attached to the first side of the electrolyte membrane 2 to form a catalyst-coated membrane 5 with the support film 7. Although the thickness of the catalyst layer 9 is depicted in an exaggerated manner in FIG. 15, the catalyst layer 9 actually has a very small thickness of 3 to 50 µm. Thus, it is possible to appropriately attach the support film 7 to the first side of the electrolyte membrane 2 over the catalyst layers 9.

The catalyst-coated membrane 5 with the support film 7 passes through the inside of the additional drying furnace 49 before being wound by the membrane assembly winding roller 56. The final finish drying of the catalyst layers 9 is performed when the catalyst-coated membrane 5 passes through the inside of the additional drying furnace 49. As a result of the catalyst-coated membrane 5 with the support film 7 being wound by the membrane assembly winding roller 56, a series of the steps of manufacturing the catalyst-coated membrane 5 is completed.

In the second preferred embodiment as well, the electrolyte membrane 2 is sucked and supported by the suction roller 20 at the time of applying the electrode ink, and the electrolyte membrane 2 is continuously supported by the second press roller 51 and the support film 7 even after the electrolyte membrane 2 is subsequently separated from the suction roller 20. Accordingly, it is possible to prevent deformation of the electrolyte membrane 2 due to swelling and shrinkage throughout transport during and after the application of the electrode ink, thereby preventing the generation of creases and pinholes. As a result, it is possible to prevent a reduction in the power generation performance of a fuel cell using the catalyst-coated membrane 5 manufactured by the manufacturing apparatus 1a according to the present invention.

With the manufacturing apparatus 1a of the second preferred embodiment, the electrolyte membrane 2 is always continuously supported by some member not only during and after the application of the electrode ink, but also from when the electrolyte membrane 2 is sent out from the electrolyte membrane unwinding roller 12 until it is wound by the membrane assembly winding roller 56. Accordingly, it is possible to inhibit deformation of the electrolyte membrane 2 due to swelling and shrinkage throughout a series of the steps of manufacturing the catalyst-coated membrane 5, thus preventing the generation of creases and pinholes.

3. Third Preferred Embodiment

Next, a third preferred embodiment of the present invention will be described. In the third preferred embodiment, the electrode ink is applied twice to one side of the electrolyte membrane 2 and a dry process is performed. FIG. 16 is a side view of a manufacturing apparatus 1b for a composite membrane according to the third preferred embodiment. In FIG. 16, constituent elements that are the same as those in the first preferred embodiment are denoted by the same reference numerals. The manufacturing apparatus 1b of the third preferred embodiment is different from the manufacturing apparatus 1 of the first preferred embodiment in that it includes two coating nozzles 30 and 130.

The coating nozzle 30 and the coating liquid supply mechanism 35 of the manufacturing apparatus 1b are the same as those in the first preferred embodiment. The manufacturing apparatus 1b of the third preferred embodiment further includes the coating nozzle 130. The coating nozzle 130 is provided on the downstream side of the coating nozzle 30 in the transport direction of the electrolyte membrane 2 by the suction roller 20 so as to divide the drying furnace 40. In other words, drying furnaces 40 are provided on the front and rear sides of the coating nozzle 130. For example, one of the three drying zones of the drying furnace 40 may be disposed on the upstream side of the coating nozzle 130, and the other two drying zones may be disposed on the downstream side of the coating nozzle 130.

The configurations of the coating nozzle 130 and the coating liquid supply mechanism 135 are respectively the same as those of the coating nozzle 30 and the coating liquid supply mechanism 35. That is, the coating nozzle 130 is a slit nozzle including a slit-shaped discharge port at its end. The coating liquid supply mechanism 135 includes a tank for storing the electrode ink and an open/close valve, and supplies the electrode ink to the coating nozzle 130. The rest of the configuration of the manufacturing apparatus 1b of the third preferred embodiment other than the two coating nozzles 30 and 130 is the same as that of the manufacturing apparatus 1 of the first preferred embodiment.

The procedure of processing performed by the manufacturing apparatus 1b of the third preferred embodiment is generally the same as that in the first preferred embodiment. First, the backsheet 6 is separated from the first side of the electrolyte membrane 2 with the second side being sucked by the suction roller 20, and the first intermittent application of the electrode ink from the coating nozzle 30 to the first side of the electrolyte membrane 2, which is transported while being sucked and supported on the suction roller 20, is performed. This step is identical to that of the first preferred embodiment.

Then, the electrode ink layers 8 are transported to positions opposing the upstream drying furnace 40 (the drying furnace 40 on the upstream side of the coating nozzle 130) by rotation of the suction roller 20, and a dry process is performed on the electrode ink layers 8 formed by the first application of the electrode ink. In this dry process, the electrode ink layers 8 may not be completely dried, and may be dried to such an extent that the surface does not stick to the hand when examined by touch.

In the third preferred embodiment, the second intermittent application of the electrode ink from the coating nozzle 130 is further performed on the electrode ink layers 8 that have been formed on the first side of the electrolyte membrane 2 by the first application of the electrode ink. Thereby, two layers of the electrode ink layers 8 are formed on the first side of the electrolyte membrane 2.

The two-layered electrode ink layers 8 formed on the first side of the two electrolyte membrane 2 are transported to positions opposing the downstream drying furnace 40 (the drying furnace 40 on the downstream side of the coating nozzle 130) by rotation of the suction roller 20, and a dry process is performed on the electrode ink layers 8. By blowing hot air to the electrode ink layers 8 from the drying furnace 40, the electrode ink layers 8 are heated to volatilize the solvent component and are thereby dried. The volatilization of the solvent component causes the electrode ink layers 8 to be dried into two-layered catalyst layers 9 laminated one above the other.

Thereafter, the dried catalyst layers 9 reach the attachment part 50 by further rotation of the suction roller 20, and the support film 7 is pressed against and attached to the second side of the electrolyte membrane 2. This step is the same as that in the first preferred embodiment. FIG. 17 is a cross-sectional view of an electrolyte membrane 2 obtained by attaching the support film 7 to the second side of the electrolyte membrane 2 having the catalyst layers 9 laminated on the first side. As with the first preferred embodiment, the support film 7 is attached to the first side of the electrolyte membrane 2 by pressing the support film 7 against the first side of the electrolyte membrane 2, and thereby, a catalyst-coated membrane 5 with the support film 7 is manufactured.

Then, the catalyst-coated membrane 5 with the support film 7 passes through the inside of the additional drying furnace 49 before being wound by the membrane assembly winding roller 56. The final finish drying of the laminated catalyst layers 9 is performed when the catalyst-coated membrane 5 passes through the additional drying furnace 49. As a result of the catalyst-coated membrane 5 with the support film 7 being wound by the membrane assembly winding roller 56, a series of the steps of manufacturing the catalyst-coated membrane 5 is completed.

In the third preferred embodiment as well, the electrolyte membrane 2 is sucked and supported by the suction roller 20 at the time of applying the electrode ink, and the electrolyte membrane 2 is continuously supported by the second press roller 51 and the support film 7 even after the electrolyte membrane 2 is thereafter separated from the suction roller 20. Accordingly, it is possible to inhibit deformation of the electrolyte membrane 2 due to swelling and shrinkage throughout transport during and after the first application of the electrode ink, thus preventing the generation of creases and pinholes. As a result, it is possible to prevent a reduction in the power generation performance of a fuel cell using the catalyst-coated membrane 5 manufactured by the manufacturing apparatus 1b according to the present invention.

With the manufacturing apparatus 1b of the third preferred embodiment, the electrolyte membrane 2 is always continuously supported by some member not only during and after the application of the electrode ink, but also from when the electrolyte membrane 2 is sent out from the electrolyte membrane unwinding roller 12 until it is wound by the membrane assembly winding roller 56. Accordingly, it is possible to inhibit deformation of the electrolyte membrane 2 due to swelling and shrinkage throughout a series of the steps of manufacturing the catalyst-coated membrane 5, thus preventing the generation of creases and pinholes.

4. Variations

Although preferred embodiments of the present invention have been described above, various modifications other than the above-described preferred embodiments may be made to the invention without departing from the spirit or essential characteristics thereof. For example, the above-described preferred embodiments describe the case in which the first press roller 11 and the second press roller 51 are each installed at a position close to and spaced a predetermined interval from the outer surface of the suction roller 20, but these rollers may be disposed in contact with the outer surface of the suction roller 20. Similarly, the third press roller 52 may be disposed in contact with the second press roller 51. Even if these rollers are disposed in contact with each other, the electrolyte membrane 2 is always continuously supported by some member from when it is sent out from the electrolyte membrane unwinding roller 12 until it is wound by the membrane assembly winding roller 56. It is therefore possible to inhibit deformation of the electrolyte membrane 2 due to swelling and shrinkage. However, when the rollers are disposed in contact with each other, a stronger force will act on the electrolyte membrane 2 and the catalyst layers 9 than in the above-described preferred embodiments.

Although the drying furnace 40 is provided with the three drying zones 41, 42, and 43 in the above-described preferred embodiments, the number of divisions of drying zones is not limited to three, and may be two, or four or more. In any case, the temperatures of the hot air blown by the drying furnace 40 sequentially increase in order from the upstream side toward the downstream side in the transport direction of the electrolyte membrane 2 by the suction roller 20.

Alternatively, a heat-shielding zone similar to that in the above-described preferred embodiments may be provided at a position between adjacent drying zones. Doing so can prevent the blasts of hot air blown out from the adjacent drying zones from mutually interfering with each other.

When the catalyst layers 9 are sufficiently dried by the drying furnace 40, the additional drying furnace 49 may not necessarily be installed.

Although the drying furnace 40 dries the electrode ink layer 8 by blowing hot air, the electrode ink layer 8 may be dried using, for example, a far-infrared heater instead.

In place of the air jetting part 60, an adhesive roller or a brush that adsorbs a foreign substance may be provided so as to be in contact with the outer surface of the suction roller 20. Alternatively, it is possible to provide a mechanism for removing a foreign substance by applying ultrasonic waves to the outer surface of the suction roller 20.

Cooling water may be passed through the inside of second press roller 51 so that the outer surface of the suction roller 20 is cooled to remove heat by heat conduction from the suction roller 20 to the second press roller 51.

The manufacturing apparatus 1a of the second preferred embodiment may be used to specify the positions of the catalyst layers 9 formed on one side of the electrolyte membrane 2, an additional electrode ink may be applied to those catalyst layers 9, and a dry process may be performed. Doing so makes it possible to manufacture a catalyst-coated membrane 5 having catalyst layers 9 laminated thereon in the same manner as in the third preferred embodiment.

The manufacturing technique according to the present invention is not limited to the applications for the manufacture of the catalyst-coated membrane 5 of a fuel cell, and is also applicable to the manufacture of a composite membrane for forming a functional layer on any other types of thin films. In particular, the manufacturing technique according to the present invention can be suitably used for manufacturing a composite membrane having a functional layer formed on a thin film, by applying a coating liquid containing a solvent to a thin film that easily undergoes deformation due to swelling and shrinkage such as the electrolyte membrane 2 described above.

While the invention has been shown and described in detail, the foregoing description is in all aspects illustrative and not restrictive. It is therefore understood that numerous modifications and variations can be devised without departing from the scope of the invention.

What is claimed is:

1. A method for manufacturing a catalyst-coated membrane for a fuel cell, comprising the steps of:
    (a) sending out a band-like electrolyte membrane having a backsheet attached to one side thereof to a suction roller;
    (b) sucking and supporting said electrolyte membrane on said suction roller through a porous body;
    (c) separating said backsheet by a first press roller with said electrolyte membrane being sucked onto said suction roller;
    (d) applying a coating liquid to said electrolyte membrane that is transported while being sucked and supported on said suction roller;
    (e) drying said coating liquid applied to said electrolyte membrane to form a catalyst layer; and
    (f) separating said electrolyte membrane having said catalyst layer formed thereon from said suction roller and causing a support film to be attached to said electrolyte membrane by pressing said support film against said electrolyte membrane by a second press roller,
    wherein
    said electrolyte membrane is always supported on at least any one of said backsheet, said suction roller, said second press roller, and said support film during manufacture of said catalyst-coated membrane.

2. The method for manufacturing a catalyst-coated membrane according to claim 1, wherein,
    in said step (d), intermittent coating in which the coating liquid is intermittently applied to said electrolyte membrane is performed.

3. The method for manufacturing a catalyst-coated membrane according to claim 1, wherein,
    in said step (f), said backsheet separated in said step (c) is attached to said electrolyte membrane as said support film.

4. The method for manufacturing a catalyst-coated membrane according to claim 1, wherein
    said coating liquid is an electrode paste.

* * * * *